(12) United States Patent
Lansinger

(10) Patent No.: US 10,717,415 B2
(45) Date of Patent: Jul. 21, 2020

(54) WASHER FLUID HEATING SYSTEM AND APPARATUS

(71) Applicant: SEEVA Technologies, Inc., Camano Island, WA (US)

(72) Inventor: Jere Rask Lansinger, Camano Island, WA (US)

(73) Assignee: SEEVA Technologies, Inc., Bellevue, WA (US)

( * ) Notice: Subject to any disclaimer, the term of this patent is extended or adjusted under 35 U.S.C. 154(b) by 153 days.

(21) Appl. No.: 15/833,953

(22) Filed: Dec. 6, 2017

(65) Prior Publication Data

US 2018/0162327 A1 Jun. 14, 2018

Related U.S. Application Data

(60) Provisional application No. 62/431,878, filed on Dec. 9, 2016.

(51) Int. Cl.
*B60S 1/48* (2006.01)
*B60K 11/02* (2006.01)
(Continued)

(52) U.S. Cl.
CPC .............. *B60S 1/487* (2013.01); *B05B 9/002* (2013.01); *B60K 11/02* (2013.01); *F24H 1/009* (2013.01);
(Continued)

(58) Field of Classification Search
CPC .......... B60S 1/487; B60S 1/488; B60K 11/02; F28D 7/103; F28D 7/12; F28F 9/0204; F28F 2009/0287
(Continued)

(56) References Cited

U.S. PATENT DOCUMENTS 3,114,168 A   12/1963  Taylor et al.
3,503,091 A    3/1970  Petry et al.
(Continued)

FOREIGN PATENT DOCUMENTS

GB       1048622 A     11/1966
WO    2013101408 A1    7/2013
WO    2018106840 A1    6/2018

OTHER PUBLICATIONS

International Searching Authority, International Search Report and the Written Opinion of the International Authority, PCT Application PCT/US2017/064966, dated Mar. 2, 2018, 12 pages.
(Continued)

*Primary Examiner* — Joel M Attey
(74) *Attorney, Agent, or Firm* — Perkins Coie LLP

(57) ABSTRACT

A washer fluid heater disposed within a vehicle having an engine cooling system and a washer fluid dispensing system. The washer fluid heater includes a plurality of thin walled, closely spaced tubular members concentrically arranged around a central axis of the washer fluid heater. Each of the tubular members is separated from an adjacent tubular member by one of a plurality of flow channels. The plurality of flow channels includes first and second groups of flow channels. The washer fluid heater also includes a first end cap and a second end cap, where the first end cap includes a first washer fluid port and a first coolant port and the second end cap includes a second washer fluid port and a second coolant port. The first and second washer fluid ports are coupled to the first group of flow channels while the first and second coolant ports are coupled to the second group of flow channels.

17 Claims, 18 Drawing Sheets

(51) Int. Cl.

| | | |
|---|---|---|
| *F28D 7/10* | (2006.01) | |
| *F28D 7/12* | (2006.01) | |
| *F28F 9/02* | (2006.01) | |
| *F24H 1/00* | (2006.01) | |
| *B05B 9/00* | (2006.01) | |
| *F24H 1/14* | (2006.01) | |

(52) U.S. Cl.
CPC ............... *F24H 1/14* (2013.01); *F28D 7/103* (2013.01); *F28D 7/12* (2013.01); *F28F 9/0204* (2013.01); *F28F 9/0246* (2013.01); *B60S 1/488* (2013.01); *F28F 2009/0287* (2013.01)

(58) Field of Classification Search
USPC ......................................................... 165/154
See application file for complete search history.

(56) References Cited

U.S. PATENT DOCUMENTS

| | | |
|---|---|---|
| 3,522,909 A | 8/1970 | Arant |
| 3,646,774 A | 3/1972 | Werner |
| 3,759,290 A | 9/1973 | D'Alba |
| 3,786,222 A | 1/1974 | Harnden et al. |
| 3,888,412 A | 6/1975 | Lindo et al. |
| 4,022,349 A | 5/1977 | McMullan et al. |
| 4,090,668 A | 5/1978 | Kochenour et al. |
| 4,481,805 A | 11/1984 | Dobesh |
| 4,516,596 A | 5/1985 | Sugisawa et al. |
| 4,575,003 A | 3/1986 | Linker et al. |
| 4,809,863 A | 3/1989 | Woodcock et al. |
| 5,522,453 A | 6/1996 | Green |
| 5,549,128 A | 8/1996 | Mansur |
| 5,693,149 A | 12/1997 | Passer et al. |
| 5,957,384 A | 9/1999 | Lansinger et al. |
| 6,032,324 A | 3/2000 | Lansinger |
| 6,133,546 A | 10/2000 | Bains |
| 6,615,438 B1 | 9/2003 | Franco et al. |
| 8,550,147 B2 | 10/2013 | Lansinger |
| 8,925,620 B2 | 1/2015 | Lansinger et al. |
| 2002/0005440 A1 | 1/2002 | Holt et al. |
| 2002/0134857 A1 | 9/2002 | Zimmer |
| 2006/0042785 A1 | 3/2006 | Werner et al. |
| 2006/0201933 A1 | 9/2006 | Carpino et al. |
| 2007/0181565 A1 | 8/2007 | Murahashi et al. |
| 2008/0272110 A1 | 11/2008 | Kamiyama et al. |
| 2010/0037415 A1 | 2/2010 | Lansinger et al. |
| 2011/0073142 A1 | 3/2011 | Hattori et al. |
| 2012/0174333 A1 | 7/2012 | Heidacker |
| 2014/0238370 A1 | 8/2014 | Pursifull et al. |
| 2015/0360853 A1 | 12/2015 | Nicmanis |
| 2015/0375715 A1 | 12/2015 | Izabel et al. |
| 2017/0210304 A1 | 7/2017 | Davies et al. |

OTHER PUBLICATIONS

International Searching Authority, International Search Report and Written Opinion, PCT Patent Application PCT/US2019/039630, dated Nov. 8, 2019, 12 pages.

WASHER FLUID HEATING SYSTEM AND APPARATUS

CROSS-REFERENCE TO RELATED APPLICATION(S)

This non-provisional utility patent application claims the benefit of and priority to U.S. Provisional Patent Application No. 62/431,878, filed Dec. 9, 2016 and titled AUTOMOTIVE WASHER FLUID HEATER AND SYSTEM FOR WINDSHIELD, WIPER, EXTERIOR LIGHTING, CRASH AVOIDANCE/MITIGATION, ADAS, AND SELF DRIVING/AUTONOMOUS VEHICLE LANDSCAPE SENSORS, which is incorporated herein in its entirety by reference thereto.

TECHNICAL FIELD

The present invention relates generally to vehicle washer fluid systems.

BACKGROUND

Defrosting and deicing of automotive vehicles' front windshields has been typically performed by conventional warm air defrosters. These warm air defrosters are heated by the heat from the coolant system which flows through a defroster core. Air fans then circulate air across the core and up to the inside surface of the windshield.

A primary disadvantage of these previously known warm air windshield defroster systems is that the overall time required to completely defrost and/or deice a front windshield is very lengthy. This relatively long time required to completely defrost and deice the front windshield results from two factors. First, the engine coolant for the internal combustion engine in the automotive vehicle must become sufficiently heated to heat the air used to defrost the front windshield. Depending upon the weather conditions, it may require several minutes for the engine coolant to become sufficiently heated to heat the air used to defrost the front windshield, and in colder, highly frosted conditions it often takes approximately 10-15 minutes for the engine coolant to become sufficiently heated for defrosting of the windshield. The second, and more important, factor impacting upon the time required to defrost the front windshield using a hot air defrost system is that the heat transfer between the air and the front windshield, as well as the heat conductance through the windshield and to the ice on the front windshield, is very inefficient. Indeed, in very cold conditions and with substantial ice buildup on the front windshield, the actual defrost/deice operation on the front windshield may require 15-30 minutes. Such a long time delay to defrost/deice the front windshield not only wastes time, but also engine fuel, which generates more global warming and polluting exhaust emissions.

Quicker defrosting/deicing of the front windshield has been achieved using systems that heat the washer fluid for the front windshield. Many of these previously known heated washer fluid systems have utilized an electric heater fluidly connected to the windshield washer system in order to heat the windshield washer fluid. However, these electrically heated windshield washer systems suffer from a number of disadvantages. First, both the manufacturing and installation costs of the electrically heated washer fluid systems are relatively high thus adding a significant cost to the overall vehicle. The automotive industry is particularly competitive so that the addition of a relatively expensive heater system for the washer fluid is economically infeasible. A second and more significant disadvantage of these electrically heated windshield washer systems is that such systems have been known to malfunction in operation. Indeed, malfunction of the heater system can result in engine compartment fires and resulting damage to the automotive vehicle. A third disadvantage is that electrically heated windshield washer systems use on board electricity which should be avoided if waste heat can be used instead, as does the present invention.

Significant improvements in heated windshield washer systems were achieved in the technology as disclosed in U.S. Pat. No. 8,550,147, issued on Oct. 8, 2013 and titled Windshield Washer Fluid Heater and System, and U.S. Pat. No. 8,925,620, issued on Jan. 6, 2015 and titled Windshield Washer Fluid Heater, both of which are incorporated herein in their entirety by reference thereto. The present technology provides additional improvement while also overcoming the above mentioned disadvantages.

SUMMARY

In at least one embodiment of the present technology provides a washer fluid heater system that comprises a washer fluid heater for use with a vehicle having an engine cooling system and a washer fluid dispensing system, wherein the washer fluid dispensing system comprises a washer fluid reservoir and at least one nozzle. The washer fluid heater comprises a plurality of thin walled, closely spaced concentric tubes that can allow for ease of manufacture, cost effectiveness, minimal weight, sealing simplicity, freeze damage resistance, overall reliability & compactness. At least one embodiment provides a heater with a plurality of tubular members having minimal practical material wall thickness concentrically arranged around a central axis and spaced apart from each other forming a plurality of flow channels, wherein each of the plurality of tubular members is separated from an adjacent tubular member by a respective one of the plurality of flow channels and wherein the plurality of flow channels comprises a first group of flow channels and a second group of flow channels different and fluidly isolated from the first group of flow channels. A first end cap is coupled to a first end portion of the washer fluid heater, and the first end cap comprises a first washer fluid port configured to receive washer fluid from the washer fluid reservoir, and a first coolant port is configured to receive heated coolant from the engine cooling system. A second end cap is coupled to a second end portion of the washer fluid heater that opposes the first end portion. The second end cap comprises a second washer fluid port coupled to the at least one nozzle, wherein the first and second washer fluid ports are fluidly coupled to the first group of flow channels and configured to carry a flow of the washer fluid therethrough. A second coolant port is coupled to a second portion of the engine cooling system, wherein the first and second coolant ports are fluidly coupled to the second group of flow channels and configured to carry a flow of the heated coolant therethrough. The first and second groups of flow channels are positioned relative to each other with each flow channel in the second group of flow channels being adjacent to a respective one of the flow channels in the first group of flow channels, and wherein the flow of heated coolant in each flow channel in the second group of flow channels heats the flow of washer fluid in each flow channel in the first group of flow channels.

Another embodiment provides a washer fluid heater disposed within a vehicle having an engine cooling system and a washer fluid dispensing system. The washer fluid dispensing system has a washer fluid reservoir and at least one nozzle. The washer fluid heater has a body with first and second opposing end portions, and a first tubular member. A second tubular member is disposed within the first tubular member and separated from the first tubular member by a first flow channel. A third tubular member is disposed within the second tubular member and separated from the second tubular member by a second flow channel. A fourth tubular member is disposed within the third tubular member and separated from the third tubular member by a third flow channel. A fifth tubular member is disposed within the fourth tubular member and separated from the fourth tubular member by a fourth flow channel. A sixth tubular member is disposed within the fifth tubular member and separated from the fifth tubular member by a fifth flow channel. A first end cap is coupled to the first end portion and comprises a first washer fluid port configured to receive washer fluid from the fluid reservoir. A first coolant port is configured to connect to the engine cooling system. A second end cap is coupled to the second end portion, and comprises a second washer fluid port configured to provide washer fluid to the at least one nozzle. A second coolant port is configured to connect to the engine cooling system. The first and second washer fluid ports are coupled to the first and fourth flow channels, and the first and second coolant ports are coupled to the second, third, and fifth flow channels. The first washer fluid port is configured to provide the washer fluid received at the first washer fluid port from the washer fluid reservoir to the second washer fluid port via the first and fourth flow channels.

Another embodiment provides an apparatus configured to receive first and second fluids, comprising plurality of tubes concentrically arranged around a central axis of the apparatus, and a plurality of flow channels. Each of the plurality of tubes is separated from an adjacent tube by a given one of the plurality of flow channels. The plurality of flow channels comprises a first group of flow channels and a second group of flow channels. A first port is fluidly coupled to the first group of flow channels, wherein the first port is configured to receive the first fluid from a first fluid source and to provide the first fluid to the first group of flow channels. A second port is fluidly coupled to the second group of flow channels, wherein the second port is configured to receive the second fluid from a second fluid source and to provide the second fluid to the second group of flow channels. A third port is fluidly coupled to the first group of flow channels and configured to receive the first fluid from the first group of flow channels. A fourth port is fluidly coupled to the second group of flow channels and configured to receive the second fluid from the second group of flow channels.

DETAILED DESCRIPTION

Figure 1:
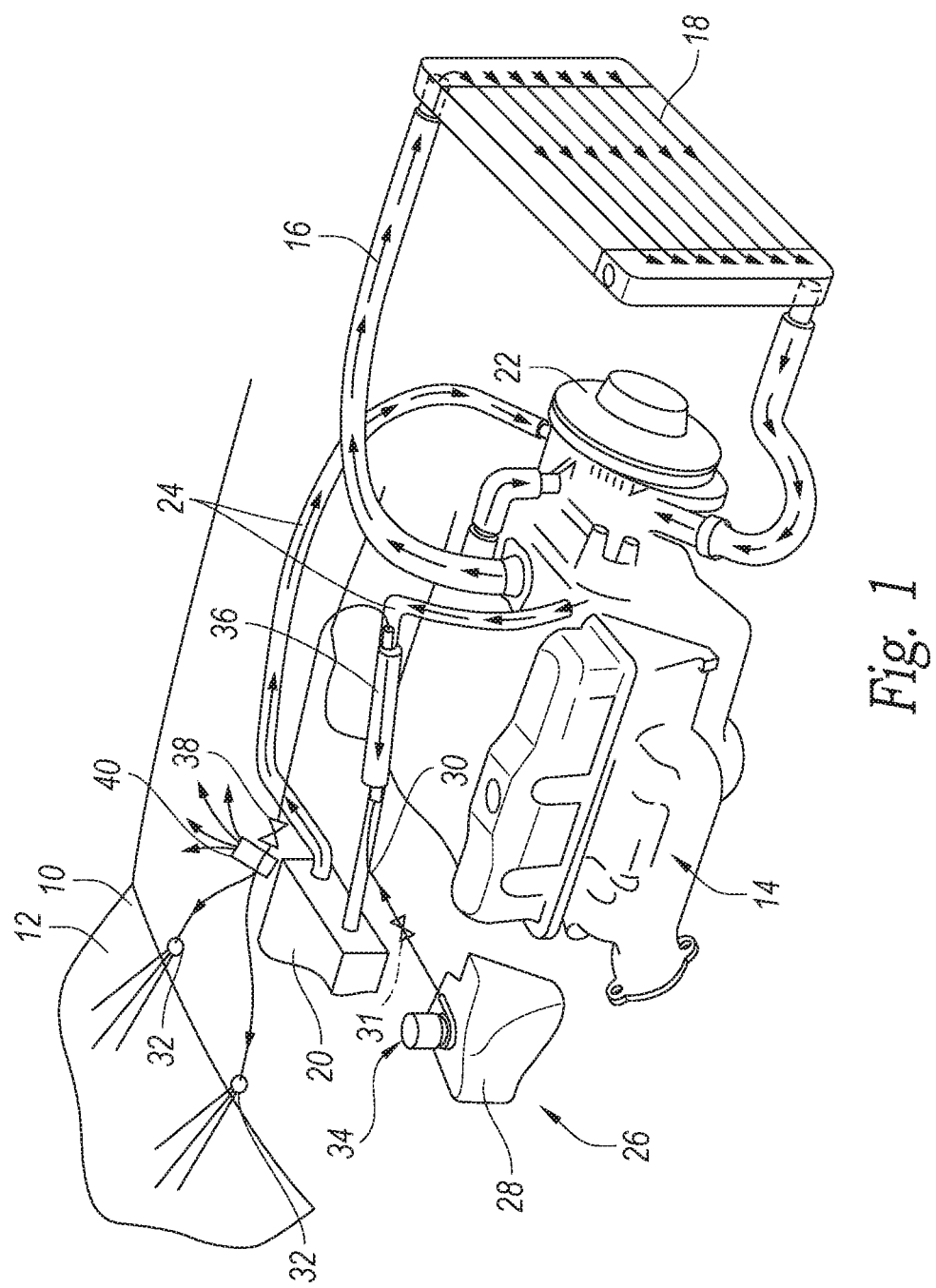
FIG. 1 is a diagrammatic view illustrating a vehicle engine, a coolant system, and windshield washer system coupled to a washer fluid heater system in accordance with an embodiment of the present technology.

FIG. 1 is a diagrammatic view of an automotive vehicle 10 having a front windshield 12. The vehicle 10 is powered by an engine 14 that includes an engine coolant system 16. The engine coolant system 16 includes internal cooling passages (not shown) within the engine. A radiator 18, which helps cool the liquid coolant contained within the engine coolant system 16, is fluidly connected to the fluid passageways in the engine 14 by conventional radiator hoses. The coolant system 16 further includes a heater core 20 through which the engine coolant is pumped by a coolant pump 22. In the conventional fashion, the heater core 20 is fluidly connected to the engine coolant passageways by heater hoses 24 so that the heat from the core 20 may be used to heat the interior of the vehicle 10.

The vehicle 10 also includes a windshield washer system 26 having a fluid reservoir 28 configured to store windshield washer fluid. The reservoir 28 is fluidly connected by washer lines 30 to nozzles 32, which are arranged to project the washer fluid onto the windshield 12 upon activation of the washer system 26. These nozzles 32 may be fixed on the vehicle itself, contained within the windshield wipers (not shown) of the vehicle, or in any other convenient location. The vehicle 10 can have other nozzles 32 coupled to the washer system 26 and mounted on other selected locations, such as next to lights, windows, sensors, cameras, etc., that may need to be cleaned during operation of the vehicle. A fluid pump 34 is fluidly connected in series with the washer fluid supply line 30 so that, upon activation, the fluid pump 34 drives the washer fluid from the fluid reservoir 28 to one or more of the nozzles 32 of the vehicle 10.

As will be discussed in further detail below, a washer fluid heating system is provided to heat and control flow distribution of the washer fluid to selected locations on the vehicle, such as to the windshield or other selected locations.

In one or more embodiments of the present technology, the washer fluid heating system can include a washer fluid heater 36, a double check valve 38, and a selector valve 40 fluidly coupled in series with the washer fluid supply line 30. In operation, at least a portion of the washer fluid is pumped from the washer fluid supply 28 and flows through the heater 36, double check valve 38, and to the nozzles 32. The vehicle's electronic control system can be programmed or otherwise configured to automatically increase engine idle speed when in 'PARK' or with automatic service brake hold while in gear to approximately 2000 RPM while washers are activated so as to maintain coolant flow velocity for increased washer heater output for better deicing & cleaning. If the vehicle has multiple nozzles 32 distributed to locations around the vehicle, the heated washer fluid can flow through a fluid selector valve 40 configured to direct the heated washer fluid to the selected nozzle 32. The washer fluid heating system can also include a flow valve, such as a one-way or a two-way check valve 31 shown in phantom lines in FIG. 1, connected to the washer fluid line upstream of the heater 36. This upstream check valve 31 can help control washer fluid back flow away from the heater, as well as control the pressure of the heated washer fluid within the heater 36 during operation of the vehicle.

Washer Fluid Heater Assembly

Figure 2:
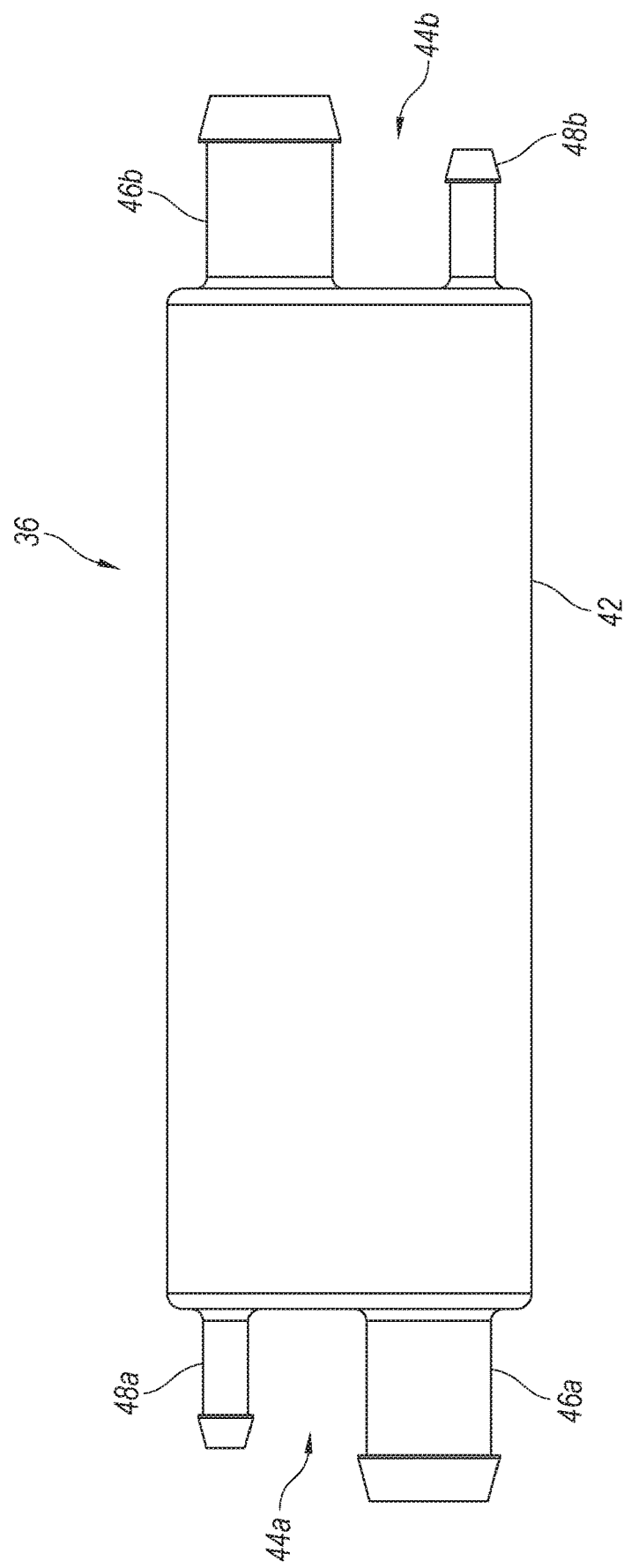
FIG. 2 is a side elevation view of an embodiment of a washer fluid heater assembly configured in accordance with an aspect of the present technology.

FIG. 2 is a side elevation view of a washer fluid heater assembly or heater 36, which has no moving parts. The heater 36 of the illustrated embodiment has separate flows of washer fluid and heated coolant fluid flowing in opposite directions through an elongated tubular body 41 that includes an outer tubular housing or outer first tube 42. Opposing ends of the tubular body 41 are coupled to first and second end portions 44a and 44b. The first end portion 44a includes a first coolant port 46a and a first washer fluid port 48a, and the second end portion 44b includes a second coolant port 46b and a second washer fluid port 48b. The first and second coolant ports 46a and 46b are fluidly coupled to each other such that hot coolant fluid from the engine's coolant system 16 is received through the second coolant port 46b and through the tubular body 41 of the heater 36 to the first coolant port 46a and back into the engine's coolant system 16. Similarly, the first and second washer fluid ports 48a and 48b are fluidly coupled to each other such that washer fluid from the fluid pump 34 and reservoir 28 is received through the first washer fluid port 48a, through the tubular body 41 in a direction opposite the flow of coolant, and out of the heater 36 through the second washer fluid port 48b. As the washer fluid flows through the tubular body 41, the washer fluid is heated by heat from the counter flow of the coolant fluid.

Figure 3:
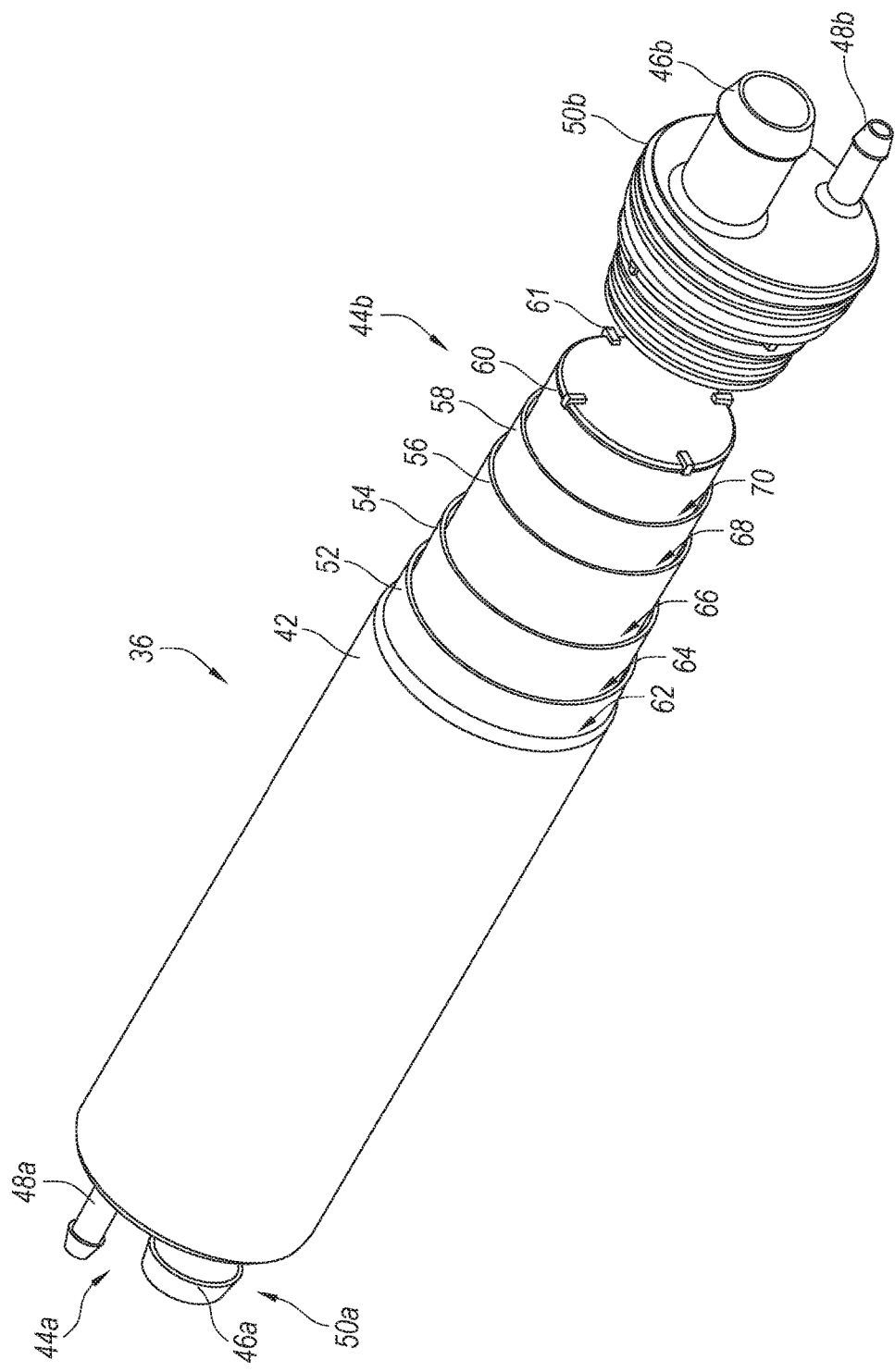
FIG. 3 is a partially exploded isometric view of the washer fluid heater assembly of FIG. 2.

FIG. 3 is a partially exploded isometric view of the heater 36. The heater 36 includes second, third, fourth, fifth, and sixth internal tubular housing members or tubes 52, 54, 56, 58, and 60 concentrically disposed within the outer first tube 42. The tubes 42, 52, 54, 56, 58, and 60 are separated from each other by first, second, third, fourth, and fifth annular-shaped flow channels 62, 64, 66, 68, and 70. The first and second end portions 44a and 44b of the heater 36 of the illustrated embodiment are formed by two end caps 50 (i.e., first and second end caps 50a and 50b) sealably connected to opposing ends of the concentric tubes 42, 52, 54, 56, 58, and 60.

The end caps 50a and 50b include the coolant ports 46a/46b, the washer fluid ports 48a/48b, and fluid distribution channels and cavities fluidly coupled to the flow channels 62, 64, 66, 68, and 70, such that a first group of the flow channels fluidly couple the first and second coolant ports 46a and 46b to each other, while a second group of the flow channels fluidly couples the first and second washer fluid ports 48a and 48b to each other, while isolating the flows to prevent the washer fluid from mixing with the coolant. The end caps 50a, 50b each also include a plurality of seal members, such as O-rings, arranged around the exterior surfaces of the end caps 50a, 50b and sealably engages with selected ones of the concentric tubes 42, 52, 54, 56, 58, and 60 to ensure a proper flow of the washer fluid through the proper flow channels, while the coolant flows in an opposite direction through the other flow channels. Accordingly, heat from the coolant can be quickly and efficiently transferred to the washer fluid flowing through the heater 36, while preventing the flows from mixing with each other.

The first, second, third, fourth, and fifth tubes 42, 52, 54, 56, and 58 in the illustrated embodiment are each formed from hollow cylinders having open ends and being made of metal or other suitable thermally conductive material. The first tube 42, which may form the exterior surface of the heater 36, has an opening with a first diameter, and the second tube 52 has a diameter less than the first diameter. The second tube 52 is disposed within or adjacent to the opening of the first cylinder such that the first and second tubes 42 and 52 are separated from each other by the first flow channel 62. The second tube 52 has an opening with a second diameter, and the third tube 54 has a diameter less than the second diameter. The third tube 54 is disposed within or adjacent to the opening of the second tube 52 such that the second and third tubes 52 and 54 are separated from each other by the second flow channel 64. The third tube 54 has an opening with a third diameter, and the fourth tube 56 has a diameter less than the third diameter. The fourth tube 56 is disposed within or adjacent to the opening of the third tube 54 such that the third and fourth tubes 54 and 56 are separated from each other by the third flow channel 66. The fourth tube 56 has an opening with a fourth diameter, and the fifth tube 58 has a diameter less than the fourth diameter. The fifth tube 58 is disposed within or adjacent to the opening of the fourth tube 56 such that the fourth and fifth tubes 56 and 58 are separated from each other by the fourth flow channel 68. The fifth tube 58 has an opening with a fifth diameter, and the sixth tube 60 has a diameter less than the fifth diameter. The sixth tube 60 is disposed within or adjacent to the opening of the fifth tube 58 such that the fifth and sixth tubes 58 and 60 are separated from each other by the fifth flow channel 70. Other embodiments can have additional concentrically arranged tubes separated from each other by annular flow channels through which fluid can pass.

The sizes of the tubes 42, 52, 54, 56, 58, and 60 relative to each other can be selected for desired heating, capacity and outflow parameters for different uses. The overall size or footprint of the heater 36 can be selected to fit the space available in the engine compartment of the type of vehicle in which the heater will be installed. The diameters of the concentric tubes 42, 52, 54, 56, 58, and 60 are maximized for the given footprint, so as to maximize the heating area of the washer fluid flowing through the heater 36. For example, the heater 36 configured for use in a passenger vehicle may have a shorter length and smaller washer fluid volumes as compared to a heater 36 for use in a truck, on a train, or other selected vehicle. In one embodiment, the tubes 42, 52, 54, 56, 58, and 60 can have a length in the range of approximately 2.5 inches (6.35 cm)-8.5 inches (21.59 cm), wherein the first tube 42 is longer than the second tube 52, which is longer than the third tube 54, which is longer than the fourth tube 56, which is longer than the fifth tube 58, which is longer than the sixth tube 60. In addition, the diameters of the tubes 42, 52, 54, 56, 58, and 60 are selected to provide flow channels 62, 64, 66, 68, and 70 with a desired radial thickness. The heater 36 is configured with each flow channel carrying the coolant has a cross sections area is sized in proportion to the amount of washer fluid heat transfer area adjacent to the coolant flow channel so as to insure suitable heat transfer and equalization of BTU/m² for proper and efficient heat transfer in the heater. In the illustrated embodiment, the heater is configured with concentric tubes that provide a ratio of the area of the wetted wall surface of the tubes to the volume of the coolant channels is at least 400 m²/m³ area (i.e., the area to volume ratio for coolant flow annuli micro channels), and preferably in the range of approximately 1000 m²/m³-2860 m²/m³. Further, the ratio of the area of the wetted wall surface of the tubes to the volume of the washer fluid channels is at least 700 m²/m³ area, and preferably in the range of approximately 1000 m²/m³-8000 m²/m³, and even more preferably in the range of approximately 2000 m²/m³-6000 m²/m³.

For example, the first flow channel 62 has a radial thickness of approximately 0.012 inches (0.305 mm), the second flow channel 64 has a radial thickness of approximately 0.016 inches (0.406 mm), the third flow channel 66 has a radial thickness of approximately 0.019 inches (0.483 mm), the fourth flow channel 68 has a radial thickness of approximately 0.015 inches (0.381 mm), and the fifth flow channel 70 has a radial thickness of approximately 0.027 inches (0.686 mm). Accordingly, the flow channels through which the respective coolant and washer fluid flow are quite thin while still allowing sufficiently high fluid flow rates through the channels during operation of the heater 36 to provide the highly heated output of the heated washer fluid from the heater 36 toward the nozzles 32, and concurrently provide good coolant flow to the conventional cabin heater core 20. The above dimensions are approximate measurements and are provided for an example only; other embodiments can have tubes with different diameters to provide flow channels with different radial thicknesses for the desired flow of washer and hot coolant fluids therethrough for the desired heater configuration and capacity.

In the illustrated embodiment, the sixth tube 60 is a hollow, closed cylinder with sealed ends 72, such that fluid can flow over the outer surface of the sixth tube 60, but no fluid flows into or through the sixth tube. In some embodiments, such as the embodiment shown in FIG. 3, the sixth tube 60 may be formed from a single piece of metal such that the sealed ends 72 of the tube 60 are formed from the same component as the rest of the sixth tube 60. In other embodiments, the sixth tube 60 may be solid (i.e., not hollow) or may be a hollow tube having ends closed and sealed by end plugs. The sealed sixth tube 60 can contain a gas (e.g., air) to maintain a lightweight heater assembly, although or other filler material can be used as desired.

FIGS. 4A-4C and 5, viewed together, show an end cap 50 removed from the tubes 42, 52, 54, 56, and 58. The following discussion about the end cap 50 is applicable to each end cap 50a and 50b on opposing ends of the heater's tubular body 41. The end cap 50 has an outer portion 74 axially aligned with and releasably coupled to an inner portion 76. The outer portion 74 includes the coolant port 46 configured to sealably connect to the heater hose 24 (FIG. 1) to carry a flow of heated coolant into or away from the heater 36. The outer portion 74 also has a washer fluid port 48 configured to sealably connect to the washer lines 30 (FIG. 1) to carry a flow of washer fluid into or away from the heater 36. The outer portion 74 also has axially aligned first and second seals, such as O-rings 78 and 80, disposed around the end cap 50 and configured to sealably engage with the inner surfaces of the respective first and second tubes 42 and 52 (FIG. 3) when the heater 36 is assembled. An annular first fluid distribution passage 86 is formed in the outer portion 74 between the first and second O-rings 78 and 80, and the first fluid distribution passage 86 is in direct fluid communication with the washer fluid port 48. A second fluid distribution passage 88 is formed around the exterior surface of the end cap 50 between the outer and inner portions 74 and 76, and the second fluid distribution passage 88 is in fluid communication with the coolant port 46, while being sealably isolated from the first fluid distribution passage 86 via the O-rings 78 and 80.

The inner portion 76 of the end cap 50 includes axially aligned third and fourth seals, such as O-rings 82 and 84, disposed around the end cap 50 and configured to sealably engage with the inner surfaces of the fourth and fifth tubes 56 and 58 (FIG. 3), respectively when the heater 36 is assembled. An annular third fluid distribution passage 90 is formed in the inner portion 76 between the third and fourth O-rings 82 and 84. The third fluid distribution passage 90 is also fluidly coupled to the washer fluid port 48. The washer fluid port 48 on one end cap 50 (i.e., the first end cap 50a) is configured to receive the washer fluid via the fluid pump 34 (FIG. 1), and the washer fluid is distributed to the first and third distribution passages 86 and 90 without being distributed to the second fluid distribution passage 88. Simultaneously, the coolant port 46 in the other end cap 50 (i.e., the second end cap 50b) receives the flow of heated coolant from the vehicle's engine, and the heated coolant flows through the second distribution passage 88 and into the second and third flow channels 64 and 66 formed between the second, third, and fourth concentric tubes 52, 54, and 56 within the heater 36. The inner portion 76 of each end cap 50 located radially inward from the fourth O-ring 84 is also in fluid communication with the coolant port 46 and with the fifth flow channel 70 between the fifth and sixth concentric tubes 58 and 60, such that the flow of heated coolant is directed through the fifth flow channel 70. Accordingly, the heat from the flow of the coolant through the second, third, and fifth flow channels 64, 66, and 70, respectively, is sufficient to quickly heat the flow of washer fluid in the first and fourth flow channels 62 and 68 as the washer fluid moves through the heater 60 in an opposite or counter flow direction relative to the coolant flow.

In embodiments where the second end cap 50b is fluidly coupled to sprayer nozzles (e.g., the nozzles 32 shown in FIG. 1), the first fluid distribution passage 86 is configured to receive washer fluid from one of the flow channels formed between the concentric tubes (e.g., from the first flow channel 62), and the third fluid distribution passage 90 is configured to receive washer fluid from a different one of the flow channels (e.g., from the fourth flow channel 68). The first and third fluid distribution passages 86 and 90 direct the flow of washer fluid to the washer fluid port 48 after the washer fluid is heated by the counter flow of coolant (FIG. 1).

Figure 4A:
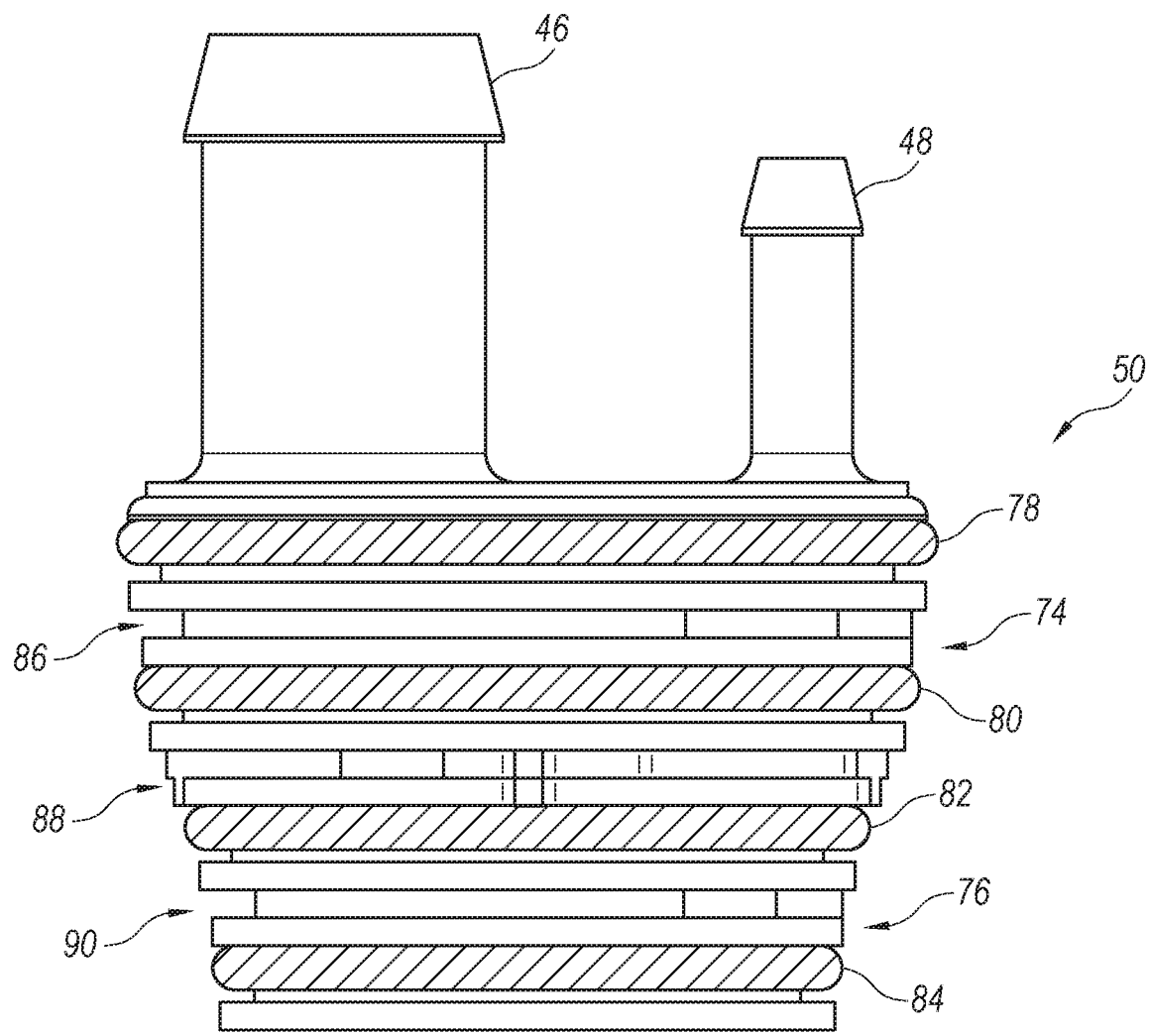
FIGS. 4A and 4B are enlarged side elevation views of an end cap in the washer fluid heater assembly of FIG. 2.
Figure 4B:
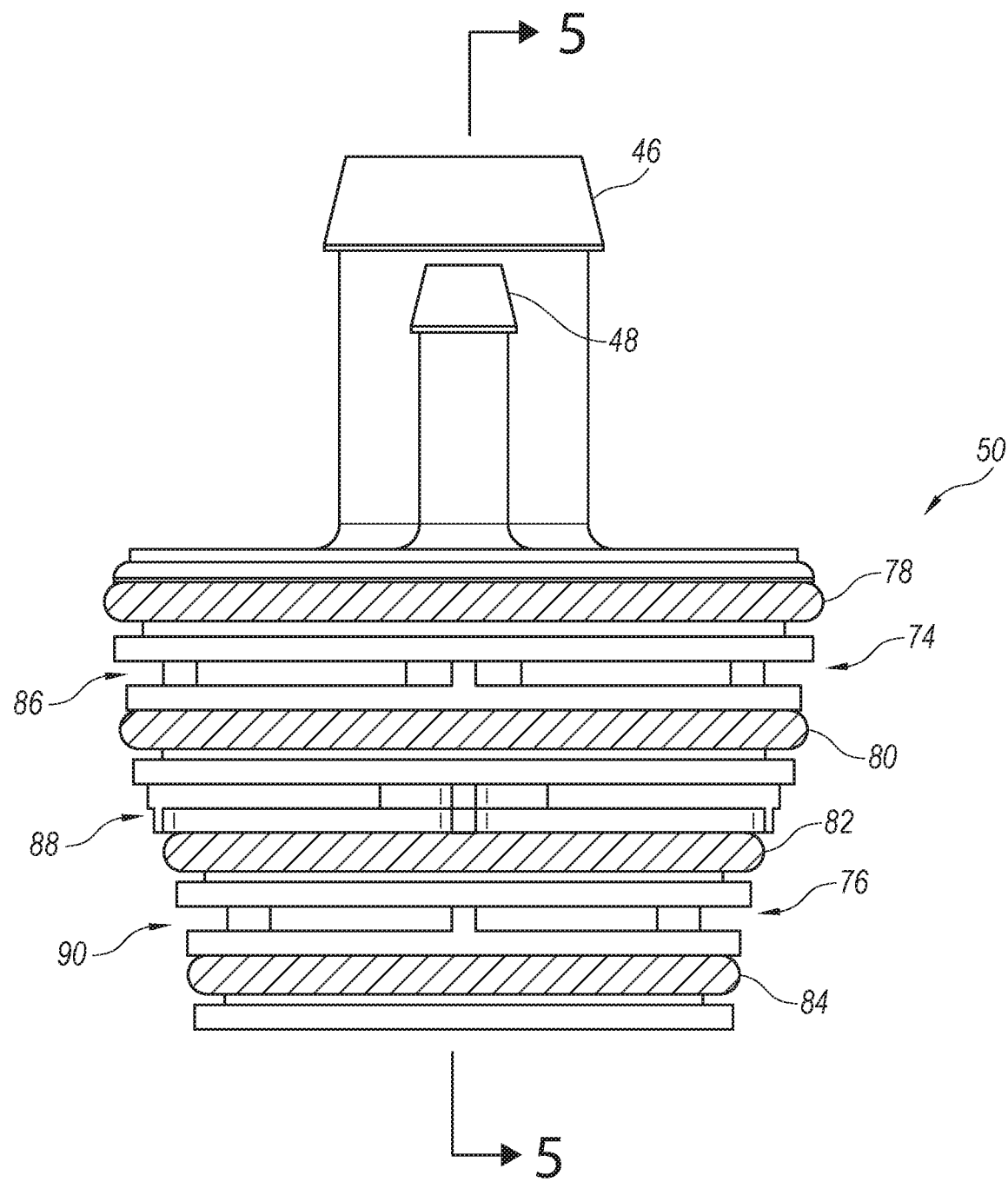
Figure 4C:
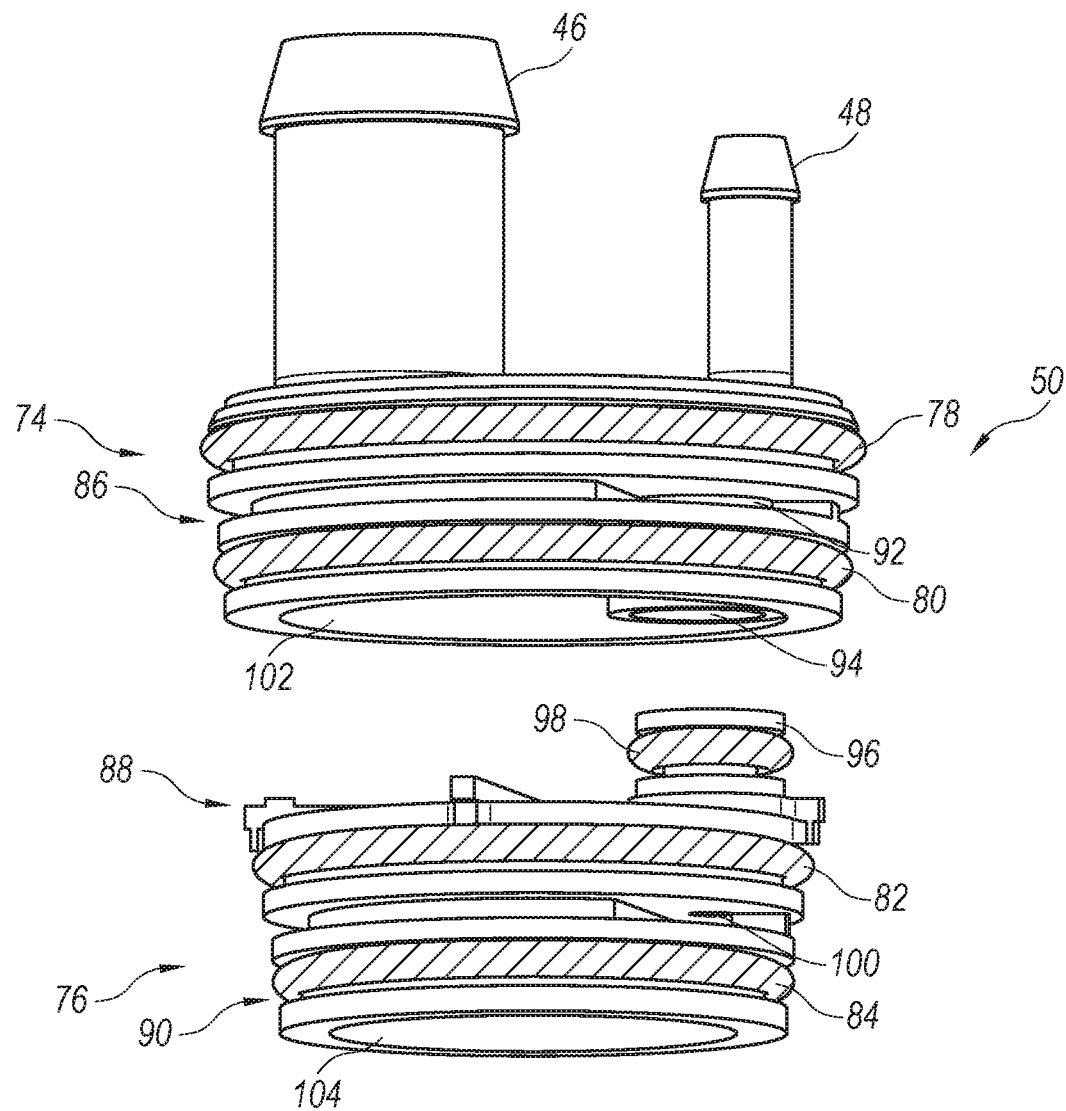
FIG. 4C is a partially exploded bottom isometric view of the end cap of FIG. 4A.
Figure 5:
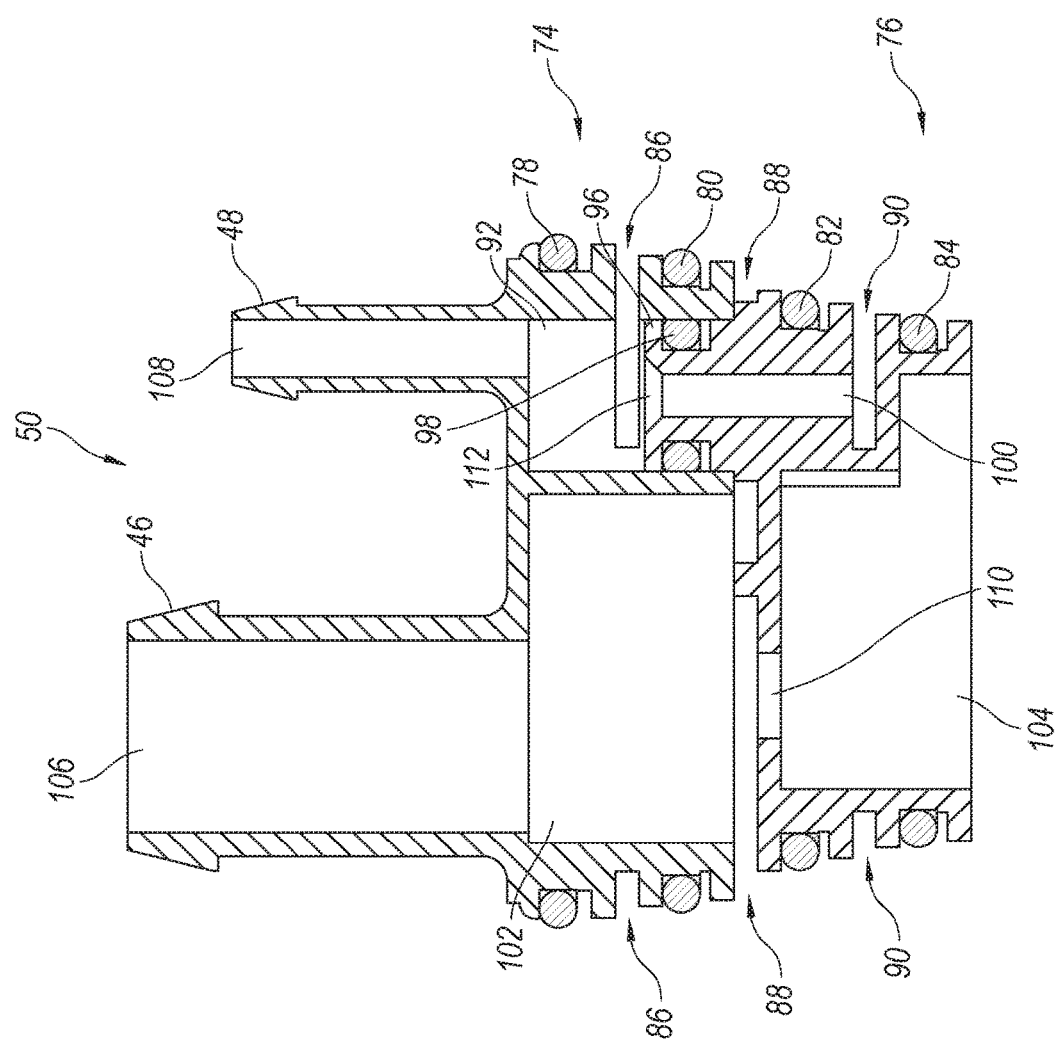
FIG. 5 is a cross-sectional view of the end cap taken substantially along line 5-5 of FIG. 4B.

As best seen in FIGS. 4C and 4D, the inner portion 76 of the end cap 50 includes an interior port 96 and the outer portion 74 of the end cap includes a receptacle 94 configured to sealably receive the interior port 96. A fifth seal, such as an O-ring 98, is provided on the interior port 96 and forms a seal between the interior port 96 and the receptacle 94. The outer portion 74 of the end cap 50 also includes a first fluid cavity 92 formed in the body of the outer portion 74 that connects the washer fluid port 48 to the first fluid distribution passage 86. The receptacle 94 has a first fluid aperture 112 in fluid communication with the first fluid distribution passage 86 below the first fluid cavity 92. A connector channel 100 extends through the interior port 96 and fluidly couples the first fluid distribution passage 86 to the third fluid distribution passage 90. The outer portion 74 of the end cap 50 also includes a second fluid cavity 102 fluidly coupled between the coolant port 46 and the second fluid distribution passage 88. A second fluid aperture 110 (FIG. 5) formed in a bottom surface of the second fluid distribution passage 88 fluidly couples the second fluid distribution passage 88 to a third fluid cavity 104 in the bottom of the inner portion 76 of the end cap 50. The third fluid cavity 104 is coupled to the fifth flow channel 70 between the fifth and sixth tubes 58 and 60.

When the washer fluid port 48 (i.e., the first washer fluid port 48a shown in FIG. 6a) on the first end cap 50a receives the washer fluid from the fluid pump 34 (FIG. 1), a portion of the received washer fluid flows into the first fluid distribution passage 86 while the remainder flows into the first fluid aperture 112, through the connector channel 100, and into the third fluid distribution passage 90. The washer fluid within the first fluid distribution passage 86 flows into the first flow channel 62 while the washer fluid within the third fluid distribution passage 90 passes into the fourth flow channel 68. The washer fluid flows through the heater body along the first and fourth flow channels 62 and 68, moving from the first end cap 50a to the second end cap 50b.

As the washer fluid enters the second end cap 50b, the washer fluid from the first flow channel 62 flows into the first fluid distribution passage 86 on the second end cap 50b, while the washer fluid from the fourth flow channel 68 flows into the third fluid distribution passage 90. The washer fluid within the third fluid distribution passage 90 flows through the connector channel 100 towards the first fluid aperture 112 and mixes with the washer fluid from the first fluid distribution passage 86 in the first fluid cavity 92. The washer fluid in the first fluid cavity 92 flows out of the heater 36 via the washer fluid port 48 (i.e., the second washer fluid port 48b shown in FIG. 6A), flowing towards the nozzles 32 (FIG. 1).

As the washer fluid flows through the heater 36 from the first end cap 50a to the second end cap 50b, the counter flow of heated coolant from the engine flows through the heater 36 from the second end cap 50b to the first end cap 50a. The hot coolant enters the heater 36 through the coolant port 46 (i.e., the second coolant port 46b shown in FIG. 6B) in the second end cap 50b. The received coolant flows from the coolant port 46 into the second fluid cavity 102, where the flow of coolant is divided. A portion of the received coolant is distributed into the second fluid distribution passage 88 while the remainder of the coolant flows into the second fluid aperture 110, through the third fluid cavity 104, and into a fourth fluid distribution passage 91b (FIG. 6D) located between the bottom of the second end cap 50b and the sixth tube 60 (FIG. 3). The coolant within the second fluid distribution passage 88 passes into the second and third flow channels 64 and 66 while the coolant within the fourth fluid distribution passage 91b flows into the fifth flow channel 70.

The third tube 54, which acts as a flow splitter, is positioned between the second and third flow channels 64 and 66 such that coolant within the second fluid distribution channel is substantially evenly distributed into both the second and third flow channels 64 and 66. The coolant flows through the second, third, and fifth flow channels 64, 66, and 70 to the first end cap 50a. The coolant within the second and third flow channels 64 and 66 passes into the second fluid distribution passage 88 on the first end cap 50a while the coolant within the fifth flow channel 70 passes into the fourth fluid distribution channel (i.e., the fourth fluid distribution channel 91a shown in FIG. 6C). The coolant in the fourth fluid distribution channel flows into the third fluid cavity 104, through the second fluid aperture 110, and into the second fluid cavity 102, where it mixes with the coolant from the second fluid distribution passage 88. The coolant in the second fluid cavity flows out of the heater 36 via the first coolant port 46a (FIG. 6A).

Figure 6A:
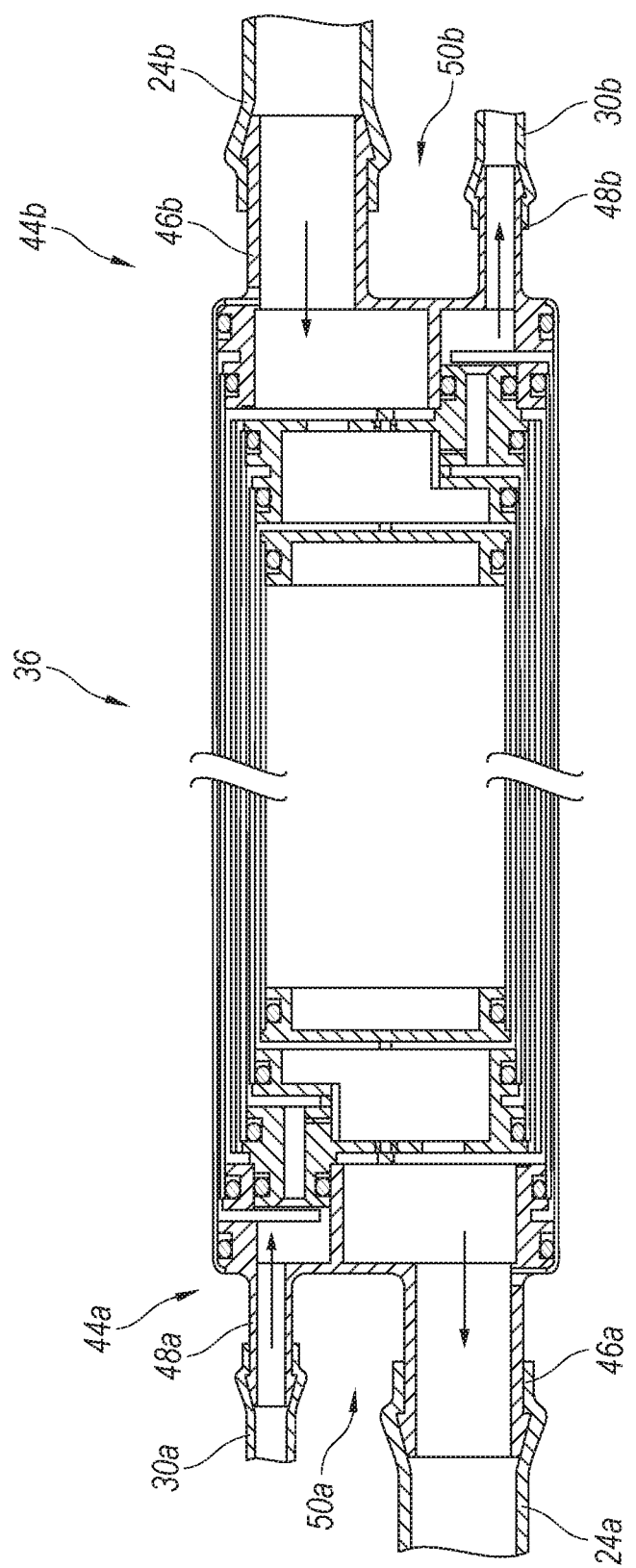
FIG. 6A is a cross-sectional view of the washer fluid heater assembly of FIG. 2 configured in accordance with the present technology.
Figure 6B:
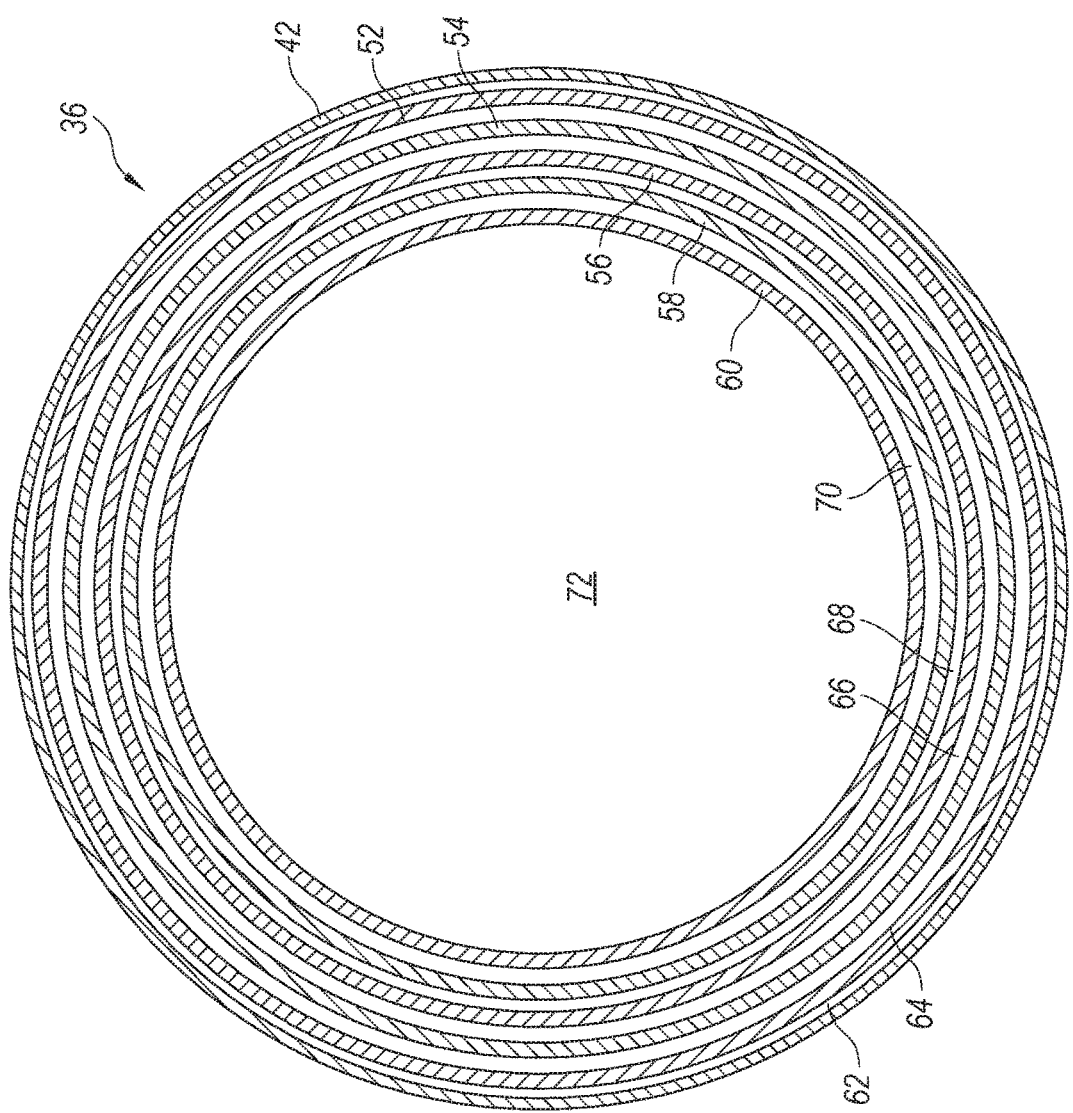
FIG. 6B is an enlarged cross-sectional view of concentric tubes in the outer housing of the washer fluid heater assembly of FIG. 6A.

As best seen in FIGS. 6A and 6B, the concentric tubes 42, 52, 54, 56, 58, and 60 are separated from a neighboring tube by one of the first, second, third, fourth, and fifth flow channels 62, 64, 66, 68, and 70, respectively. When the heater 36 is in use and the counter flows of washer fluid and coolant are moving through the respective flow channels 62, 64, 66, 68, and 70, the fluid located within a given one of the annular-shaped flow channels is only separated from the fluid located within an adjacent annular-shaped flow channel by the thin, thermally conductive sidewall of the adjacent tubes 52, 54, 56, and 58. The sidewalls of the tubes readily and efficiently transmit heat from the flow of hot coolant to the adjacent flow of washer fluid. In the illustrated embodiment, the tubes 42, 52, 54, 56, 58, and 60 are made of metal, such as corrosion resistant, anodized aluminum, having a thickness less than approximately 0.24 inches (6.1 mm), and preferably in the range of approximately 0.010-0.10 inches (0.254-2.54 mm), and more preferably in the range of approximately 0.020-0.06 inches (0.508-1.524 mm), and even more preferably approximately 0.028 inches (0.711 mm). The tubes need not all be made of the same material. For example, the outermost tube 42 can be a plastic or other non-metal material with minimal heat conductivity so the exterior surface of the heater 36 will remain relatively cool. Other tubes, particularly the tubes between the heated coolant and the washer fluid, can be copper or other highly thermally conductive to facilitate heat transfer to the washer fluid. In the illustrated embodiment, the third tube 54, which has coolant flow on both sides also need not be made of a highly thermally conductive material. The temperature of the coolant entering the heater (when the engine is operating and is at least generally warmed up) is in the range of approximately 180° F. to 250° F., and the washer fluid enters the heater at approximately outside ambient temperature (e.g., approximately in the range of −30° F. to 110 F). The heat transfer within the heater 36 to the washer fluid is such that the washer fluid will exit the heater 36 at an initial temperature in the range of approximately 160° F. to 175° F., and will level off to approximately 120° F. during the spraying time of approximately 15 seconds.

As indicated above, the washer fluid and hot coolant are flowing in opposite directions in the respective very thin flow channels 62, 64, 66, 68, and 70 between the thermally conductive tubes. In order to provide enough washer fluid and coolant through the thin flow channels during operation of the heater 36 so as to rapidly heat the washer fluid to a highly effective temperature while also maintaining a relatively low pressure drop in the coolant across the heater, the fluid's flow through the thin flow channels at fairly high flow rates (i.e., flow velocities). As a result, the higher flow velocities in the thin flow channels provide a greater heat transfer rate (i.e. BTU/min.) as compared to slower fluid flow rates. One of the reasons is because fluid flows with the higher flow rates in the thin flow channels will have thinner flow boundary layers at the surfaces of the spaced apart tubes defining the thin flow channel. Thermal transfer to and from the solid tube only occurs in a direction substantially perpendicular across the boundary layer thickness (i.e., the distance from a heat transfer wall to approximately 99% of the maximum fluid flow velocity), such that a higher heat transfer rate can be achieved using higher flow rates that provides thinner flow boundary layers adjacent to the thermally conductive tubes. Accordingly, the amount of heat transferred from a fluid (e.g., the hot coolant) into a solid (e.g., the aluminum wall of the tube 52/56/58) is dependent on, inter alia, the flow rate of the liquid, and the thickness of the flow boundary layers. While the overall temperature change in a fluid may be greater in a slow moving fluid, the higher flow rates through the very thin flow channels provide a greater heat transfer rate. Accordingly, the heater's construction with the simple, round, concentric, very closely spaced thermally conductive tubes forces very thin fluid flow boundary layers, which provide a plurality of parallel flow paths for the hot coolant and washer fluid, which results in quickly heating the washer fluids to the operational temperatures of approximately 120-175° F.

The heater 36 of the illustrated embodiment can provide heated washer fluid that provides up to approximately 341 BTU/min (i.e., ~6000 Watts) when the vehicle engine is warmed up and the coolant is flowing through the heater 36 at operating temperature. Under testing conditions wherein, at 0° F. ambient temperature, with 0.01 ounces/in.$^2$ of frost on a windshield, having an area of approximately 1,600 in$^2$, the windshield will be covered with approximately 1 lb. of frost/ice. The latent heat to melt 1 lb. of ice is approximately 144 BTUs at 32° F. Accordingly, the heated washer fluid alone (without using the wiper blades) with 341 BTU/min will melt the 1 lb. of ice in approximately 25.34 seconds. When the heated washer fluid is applied to the frosted windshield, assuming no heat loss in transit from the nozzles, and the wiper blades are activated to help remove loosened ice or frost, the result is that the windshield frost/ice will be loosened and cleared extremely quickly, and well less than 20 seconds, resulting in a windshield viewing through which the vehicle driver and passengers can clearly see.

Figure 6C:
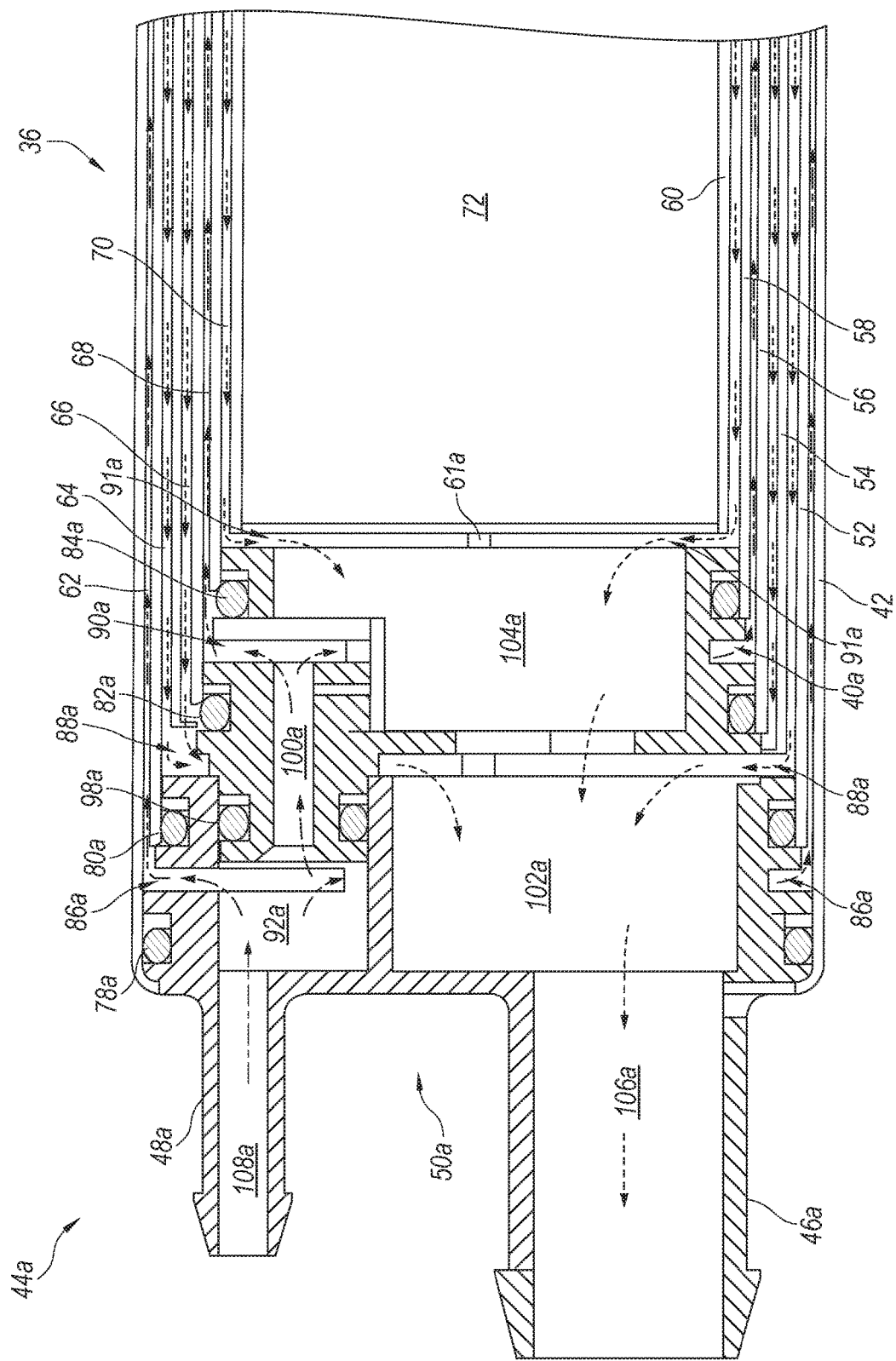
FIG. 6C is an enlarged cross-sectional view of one end portion of the washer fluid heater assembly of FIG. 6A.
Figure 6D:
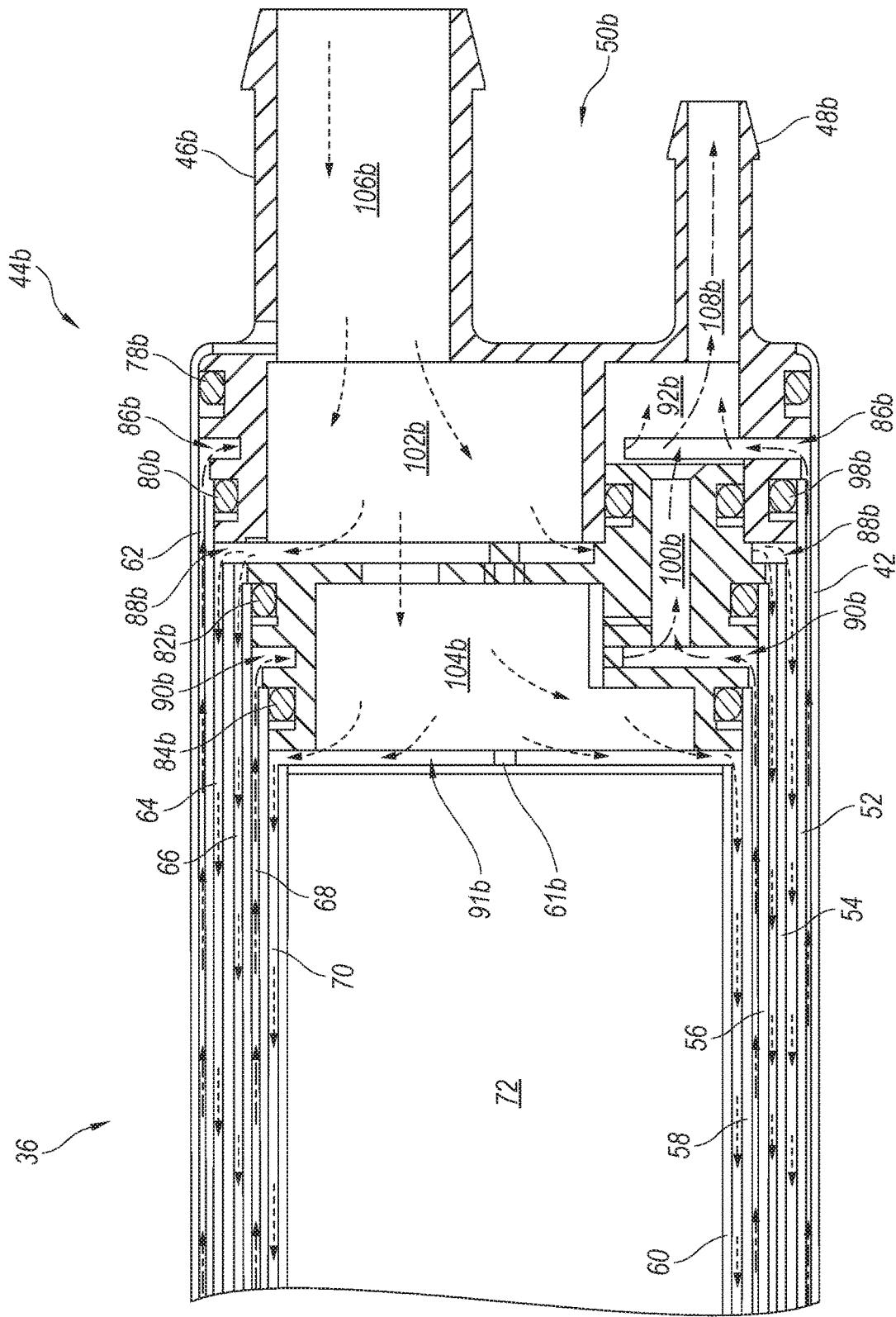
FIG. 6D is an enlarged cross-sectional view of the other end portion of the washer fluid heater assembly of FIG. 6A.

FIGS. 6C and 6D show enlarged cross-sectional views of the first and second end portions 44a and 44b of the heater 36. The first and second end caps 50a and 50b are sealably coupled to the tubes 42, 52, 54, 56, 58, and 60 such that the first and second washer fluid ports 48a and 48b are fluidly coupled to the first and fourth flow channels 62 and 68 while the first and second coolant ports 46a and 46b are fluidly coupled to the second, third, and fifth flow channels 64, 66, and 70. Each of the first, second, third, and fourth O-rings 78a, 80a, 82a, and 84a, which are disposed around the exterior surface of the first end cap 50a, and each of the first, second, third, and fourth O-rings 78b, 80b, 82b, and 84b, which are disposed around the exterior surface of the second end cap 50b, sealably engage with the inner surface of a given one of the first, second, fourth, and fifth tubes 42, 52, 56, and 58 to prevent any undesirable leaking between the end caps 50a and 50b and the tubes 42, 52, 56, and 58. The illustrated embodiment provides sealed, friction fit interfaces that prevent leaking in or from the heater. Other embodiments can include adhesives to facilitate the sealed interconnection between the components while avoiding a brazed or welded construction, which can be labor intensive and expensive to manufacture. Other embodiments can use brazing or welding between some or all of the components when such manufacturing, and the associated cost, is warranted.

The sealed ends of the sixth tube 60 are axially separated from the bottom surface of each end cap 50a and 50b to provide an opening through which the flow of fluid around the sixth tube can enter or exit the third fluid cavity 140a/140b of the respective end cap 150a/150b. The opening between the sealed sixth tube 60 and the end caps 50a/50b can be formed by standoffs 61a and 61b extending from the ends of the sixth tube 60 and engaging the bottom surfaces of the end caps 50a/50b. In other embodiments, the standoffs can be attached and extending from the bottom surfaces of the end caps 50a/50b. Other embodiments can have other configurations that create the spaces between the ends of the sixth tube 60 and the end caps 50a/50b to provide fluid access to the fourth fluid distribution passages 91a and 91b, so that the fluid (i.e., the coolant) can flow between the third fluid cavities 104a and 104b and the fifth flow channel 70.

As indicated above, the second fluid distribution passages 88a/88b in the endcaps 50a/50b are coupled to both the second and third flow channels 64 and 66, and the third tube 54 acts as a flow splitter that divides the coolant flow between the second and third flow channels 64 and 66. The effect of the flow-splitting third tube 54 is to reduce thickness of the flow of hot coolant flowing through the second and third flow channels 64 and 66 and immediately adjacent to the counter flow of washer fluid in the respective first and fourth flow channels 62 and 68. As a result, the efficiency of heat transfer from the hot coolant to the washer fluid within the first and fourth flow channels 62 and 68 is substantively increased due to the resulting thinning of the associated boundary layers. As indicated above, higher fluid flow rates that provide thinner flow boundary layers at the tubes provide a higher heat transfer rate to the solid, thermally conductive tube. The use of the flow splitting third tube 54 effectively decreases the area through which the coolant flows, which increases the coolant flow velocity and decreases the flow boundary layers at the second, third and fourth tubes 52, 54, 56 and increases the heat transfer rate to the flow of washer fluid in the first and fourth flow channels 62 and 68.

The flow splitting occurs in the illustrated embodiment at least in part because the ends of the third tube 54 are not sealed and are axially separated from the first and second end caps 50a and 50b forming openings in fluid communication with the second and third flow channels 64 and 66. The openings can be created by standoffs formed on the end caps 50a/50b adjacent to the second fluid distribution channels 88a and 88b and configured to engage the ends of the third tube 54. Accordingly, the coolant within the second fluid distribution passage 88b may flow into both the second and third flow channels 64 and 66 at the second end portion 44b of the heater 36 and any fluid within the second and third flow channels 64 and 66 may flow into the second fluid distribution passage 88a at the first end portion 44a. In another embodiment, the standoffs can be attached to the ends of the third tube 54, or other separation structure can be used to create the openings for flow of the fluid around the flow splitting third tube 54.

In some embodiments, the efficiency of the heater in heating the washer fluid may be controlled for a selected range of output temperatures of the washer fluid by increasing or decreasing the thickness of the flow channels through which the coolant flows. The selected sizes of the flow channels carrying the coolant can also be a function of the expected temperatures of the coolant as it enters the heater. In some embodiments, the heater 36 may not need the flow splitting third tube 54, so the second fluid distribution channels 88a and 88b are fluidly coupled to a single combined flow channel positioned between the second and fourth tubes 52 and 56. In these embodiments, the width of the combined flow channel (i.e., the distance between the second and fourth tubes 52 and 56) is larger, meaning that an increased volume of the coolant is flowing down the center of the combined flow channel, which may result in a larger flow boundary layer at the second and fourth tubes 52 and 56, thereby decreasing the heat transfer efficiency from the coolant through the second and fourth tubes 52 and 56 and to the adjacent flows of washer fluid. The percentage of the coolant moving through the combined flow channel at elevated speeds (i.e., at speeds where the rate of heat transfer between the liquid and the tubes 52 and 56 is low) is high due to the large width of the combined flow channel. As a result, the amount of heat transferred from the coolant to the second and fourth tubes 52 and 56 as it moves through the combined flow channel is somewhat lower, meaning that the amount of heat transferred into the washer fluid moving through the first and fourth flow channels is also somewhat lower, thereby providing a reduction of temperature change between the washer fluid entering the heater 36 and the temperature of the washer fluid exiting the heater 36.

In some embodiments that include the flow splitting third tube 54, the amount of heat transferred from the coolant to the second and fourth tubes 52 and 56 is higher. Positioning the third tube 54 between the second and fourth tubes 52 and 56 decreases the maximum possible distance between a solid (i.e., the second, third, or fourth tubes 52, 54, or 56) and a given point within the second or third flow channels 64 and 66 that the coolant may flow past. Decreasing this distance causes the flow rate of coolant at points within the second and third flow channels to decrease, thereby increasing the amount of heat transferred into the second and fourth tubes 52 and 56 and causing the amount of heat transferred into the washer fluid moving through the first and fourth flow channels 62 and 68 to also increase. As a result, the temperature of the washer fluid leaving the heater 36 is higher in embodiments that include the third tube 54 than in embodiments that do not, meaning that the heated washer fluid is more effective at deicing and defrosting components of the vehicle.

In some embodiments, such as the embodiment shown in FIGS. 6A, 6C, and 6D, the washer fluid and coolant are received at opposing ends of the heater 36 such that washer fluid enters the heater 36 at the first end cap 50a and exits the heater 36 at the second end cap 50b while the coolant enters the heater 36 at the second end cap 50b and exits the heater 36 at the first end cap 50a. However, this is merely an example. In other embodiments, both the washer fluid and coolant enter the heater 36 at the first end cap 50a and exit the heater 36 at the second end cap 50b.

The washer fluid entering the heater 36 at the first washer fluid port 48a has a first pressure dependent on, inter alia, the strength of the fluid pump used to pump the washer fluid out of the fluid reservoir. However, the washer fluid leaving the heater 36 from the second washer fluid port 48b may have a second pressure less than the first pressure. Forcing the washer fluid to move through the first and fourth flow channels 62 and 68 as it moves through the heater 36 decreases the flow rate (e.g., lbs/min.) of the washer fluid such that the pressure of the washer fluid leaving the first and fourth flow channels 62 and 68 is less than the pressure of washer fluid entering the flow channels.

The change in fluid pressure between the washer fluid entering a given flow channel and the washer fluid exiting the flow channel is dependent on, inter alia, the cross-sectional area of the flow channel. For example, if the cross-sectional area of the fourth flow channel 68 is greater than the cross-sectional area of the first flow channel 62, then, ignoring the secondary effect of a minor difference in flow channel length, more washer fluid can flow through the fourth flow channel 68 than the first flow channel 62, resulting in the fluid pressure of washer fluid exiting the fourth flow channel 68 to be greater than that of the washer fluid exiting the first flow channel 62. Approximate maximum heat transfer of the two washer fluid flow channels combined is achieved by having the cross-sectional flow area of each of the two channels be in inverse proportion to the heat transfer area from the coolant side of each washer fluid channel. As seen in FIGS. 6A, 6C and 6D, the outer channel 62 will acquire heat from one coolant channel wall while the smaller diameter inner channel 68 will acquire heat from two coolant channel walls. It follows that the outer washer fluid channel 62 should be about as thin as the inner channel 68.

In some embodiments, the outer surface of the first tube 42 is exposed to air. However, this is merely an example. In other embodiments, the first tube 42 is covered in an insulative material to reduce the amount of heat lost from the exterior surface of the first tube 42. This insulative material may be formed from a plastic or polymer-based material configured to retain heat.

Double Check Valve

After leaving the heater 36, the heated washer fluid flows towards the valve 38, which is fluidly coupled in series between the heater 36 and the nozzles 32. When an operator of the vehicle has finished using the heated washer fluid to clean, defrost, and/or deice the desired vehicle component, the fluid pump that pumps washer fluid out of the reservoir is turned off, preventing any further washer fluid from entering the heater 36. However, some washer fluid may remain within the heater 36. Furthermore, a portion of the washer fluid that had previously left the heater 36 but not yet been sprayed by the nozzles may remain in the washer line 30b between the heater 36 nozzles 32. During operation of the vehicle, however, the hot engine coolant continues to flow through the heater 36 and heat the washer fluid remaining in the heater 36. The washer fluid typically includes water, ethanol, isopropanol, ethylene glycol, etc., such that the washer fluid remaining within the heater may eventually boil, and the resulting increased vapor pressure in the heater can force the washer fluid out of the heater 36 towards the nozzles 32. If a double check valve were not used in the washer fluid system, this boiling of the washer fluid within the heater can result in undesirable delayed momentary spray of washer fluid out of the nozzles 32 onto the windshield after activation of the fluid pump 34 which would require a momentary reactivation of the wipers to clear. The double check valve 38 is configured to control the flow of heated washer fluid downstream of the heater 36 and upstream of the nozzles.

Figure 7:
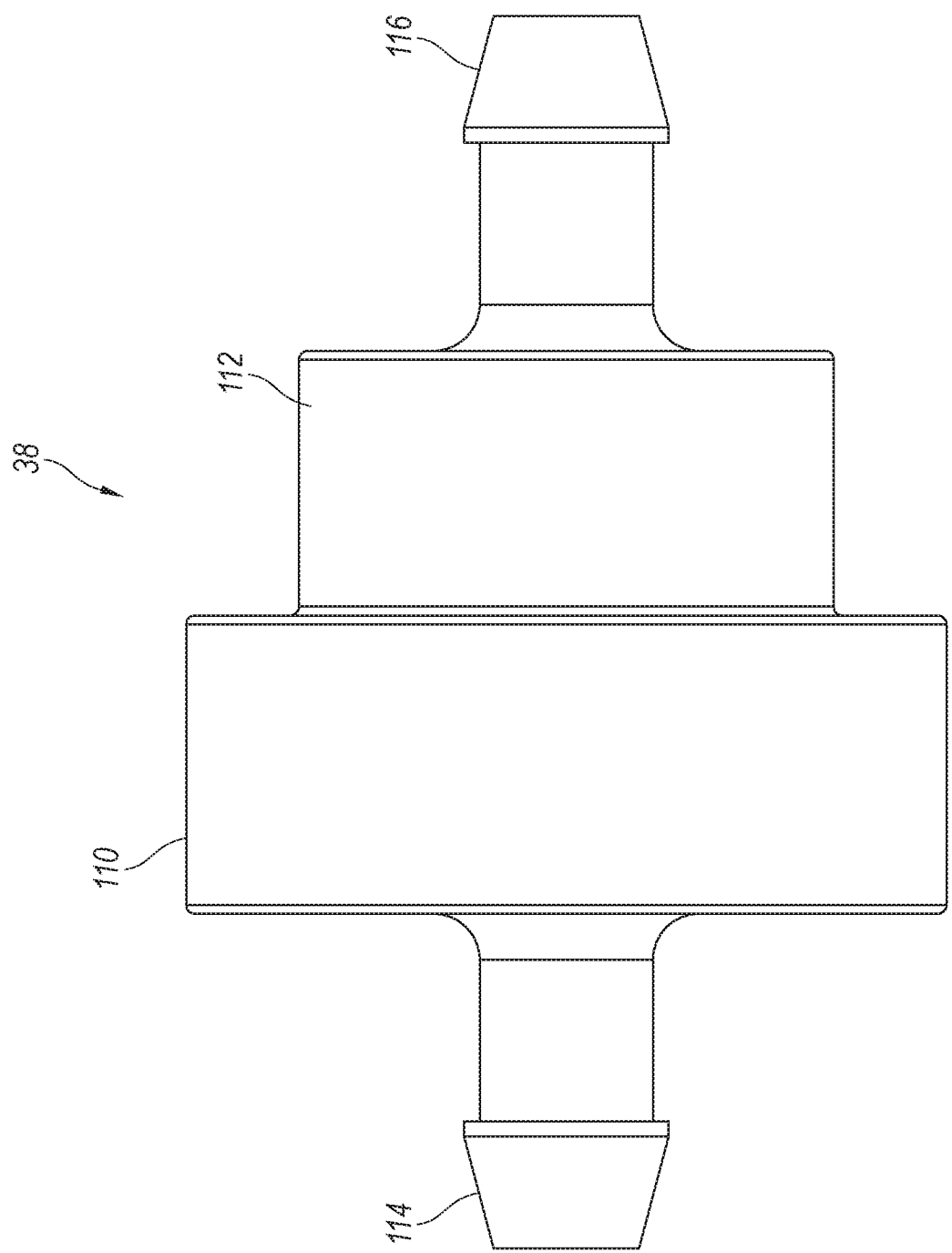
FIG. 7 is an enlarged side view of a check valve assembly in the washer fluid heating system in accordance with one or more embodiments of the present technology.

FIG. 7 is an isometric side view of a double check valve 38 connected to the washer line 30 downstream of the heater 36 (FIG. 1). In the illustrated embodiment, the valve 38 includes an inflow cap 114 coupled to an outflow cap 116. The inflow cap 114 includes an inflow port 118 configured to receive washer fluid from the heater 36. The outflow cap 116 includes an outflow port 120 coupled to the washer fluid dispensing system. The inflow and outflow ports 118 and 120 are fluidly coupled to each other such that washer fluid received at the inflow port 118 may flow through the valve 38 towards the outflow port 120.

Figure 8:
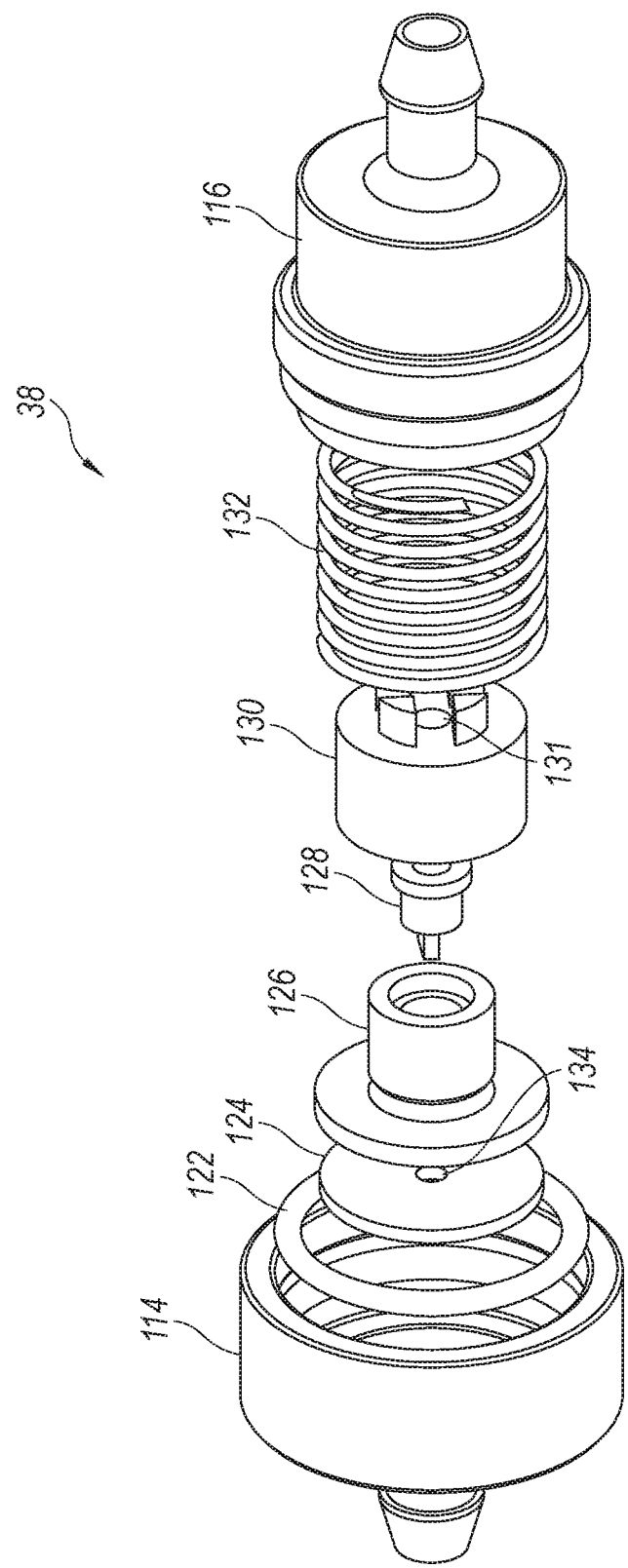
FIG. 8 is an exploded isometric view of the check valve assembly of FIG. 7.

FIG. 8 is an exploded view of the valve 38. The valve 38 includes a piston 126 and a piston cap 130 attached to the piston 126. The piston 126 is disposed within the inflow cap 114 and an O-ring 122 is arranged around an interior perimeter of the inflow cap 114 to prevent fluid from leaking out of the valve 38 between the inflow cap 114 and outflow cap 116. A rubber seat sealing spacer 124 is positioned between the head of the piston 126 and the inflow cap 114 and a spring 132 is arranged around the piston cap 130 and between the piston head of the piston 126 and the outflow cap 116. The spring 132 applies a force on the piston 126 that pushes the head of the piston 126 towards the inflow cap 114, forming a seal between the piston 126 and the inflow cap 114 created by the rubber seat sealing spacer 124. The seal formed by the piston 126 within the check valve 38 is configured to restrict flow of washer fluid toward the nozzles 32 until activation of the washer pump 34, which creates a washer fluid pressure sufficient to move the piston 126 from a closed position to an open position for flow of the washer fluid through the check valve toward the nozzles 32. When the piston 126 is in the closed position, a backflow of washer fluid cannot flow around the piston 126 back toward the heater 36 (FIG. 1).

As discussed in greater detail below, the valve 38 is configured to control a portion of backflow of the washer fluid toward the heater 36 in selected conditions. The valve 38 includes a central duckbill valve 128 axially aligned with the piston 126 between the piston head and the piston cap 130 such that no fluid may flow around the sides of the duckbill valve 128. The piston cap 130 has a central opening 131 aligned with the duckbill valve 128 and configured to allow a selected small volume of backflow of washer fluid upstream of the double check valve 38 to move through the outflow cap 116 toward the duckbill valve 128. The piston head has a small central opening 138 axially aligned with the duckbill valve 128 and aligned with a small central opening 134 in the rubber seat sealing spacer 124. The small volume of backflow of washer fluid passing through the duckbill valve 128 can flow through the central openings 138 and 134 and the inflow port 118 and out of the double check valve 38 back toward the heater 36.

Figure 9A:
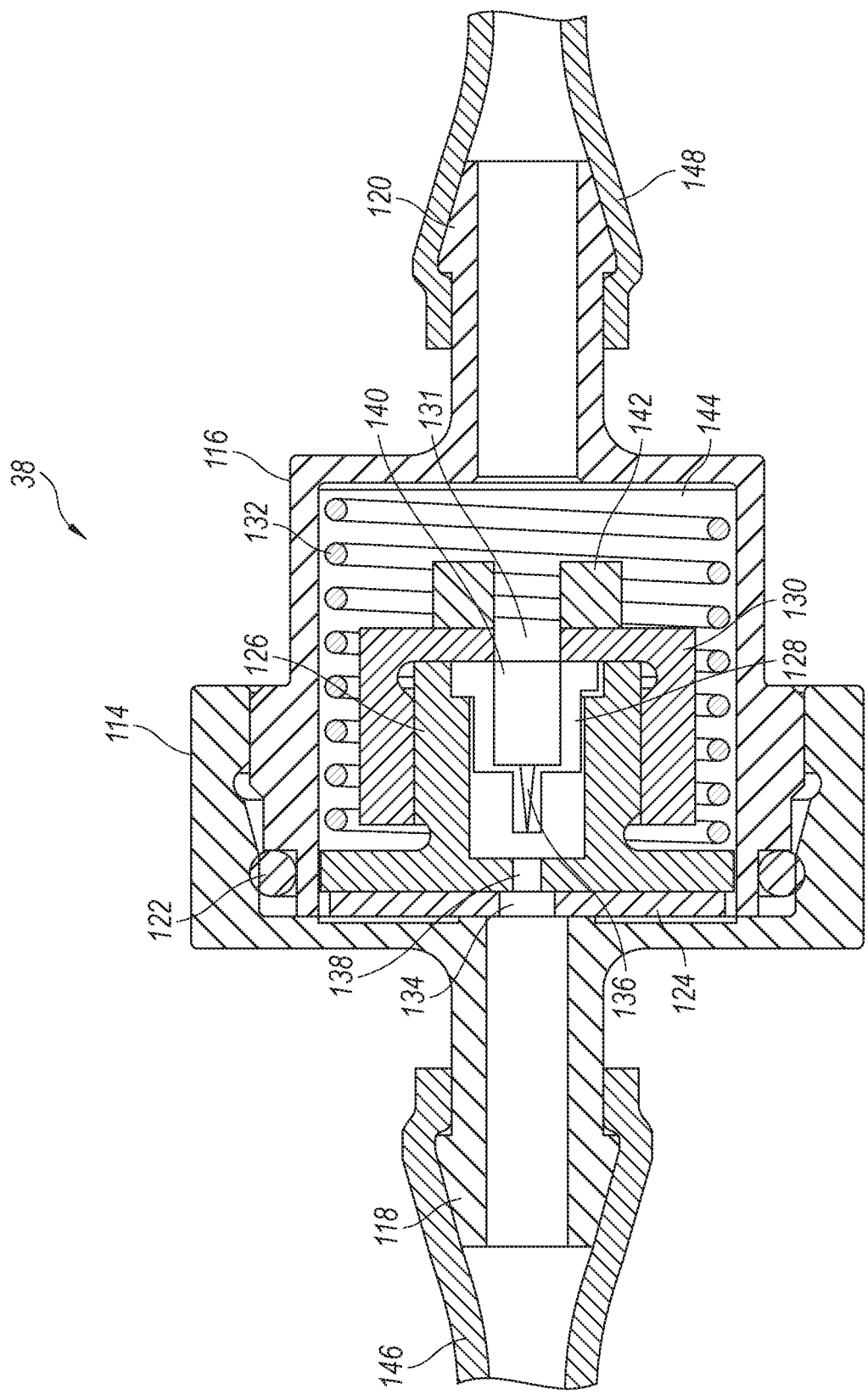
FIG. 9A is a cross-sectional view of the check valve assembly taken substantially along line 9A-9A of FIG. 7.

FIG. 9A is a cross-sectional view of the valve 38 fluidly coupled between first and second washer lines 146 and 148. The first washer line 146, which may be fluidly coupled to the second washer line 30b shown in FIG. 6A, is attached to the valve 38 at the inflow port 118, and the second washer line 148 is attached to the valve 38 at the outflow port 120. The O-ring 122 is positioned between the inflow cap 114 and the outflow cap 116 to prevent washer fluid from leaking between the two caps 114 and 116. The rubber seat sealing spacer 124 is positioned between an inner wall of the inflow cap 114 and the head of the piston 126. The spring 132 applies a force on the piston 126, which urges the piston to the closed position. More specifically, the spring 132 pushes the piston head toward the inner wall of the inflow cap 114 so as to sealably sandwich the rubber seat sealing spacer 124 between the piston 126 and the inflow cap 114 and form a seal that prevents washer fluid received at the inflow port 118 via the first fluid line 146 from passing by the piston 126 when the piston is in the closed position. The spring 132 holds the piston 126 in the closed, extended position until the fluid pressure of the washer fluid is high enough at the inflow cap 114 to move the piston away from the inner wall of the inflow cap 114 to an open position.

Figure 9B:
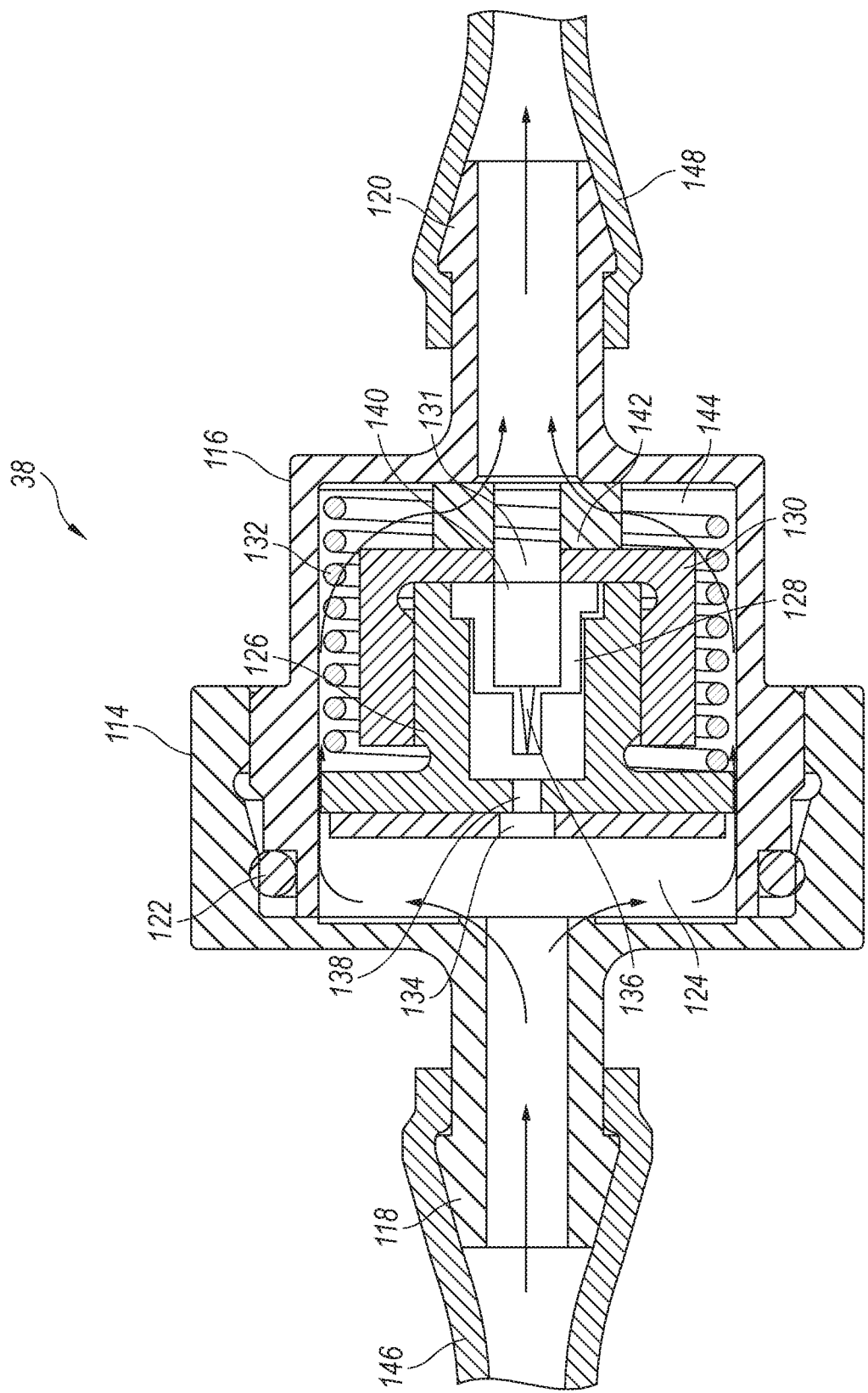
FIG. 9B is a cross-sectional view of the check valve assembly of FIG. 9A in an open position.

FIG. 9B is a cross-sectional view of the valve 38 when high pressure washer fluid is provided to the valve 38, such as when the fluid pump 34 is activated to drive washer fluid through the heater toward the nozzles 32 (FIG. 1). Before the fluid pump 34 is activated, the piston 126 is in the closed position. When the fluid pump 34 is activated and the washer fluid flows through the heater 36 (FIG. 1), the heated washer fluid enters the inlet port 118 in the inflow cap 114 and presses against the rubber seat sealing spacer 124 and the head of the piston 126. When the washer fluid pressure is greater than a threshold pressure (sometimes referred to as a "cracking pressure"), the force applied on the piston 126 and the rubber seat sealing spacer 124 by the washer fluid will be greater than the opposing force from the spring 132. Accordingly, the piston will move away from the closed position (FIG. 9A), away from the inflow cap 114 and toward the open position.

The head of the piston 126 may be circular and may have a diameter that is less than that of the inner portions of the inflow and outflow caps 114 and 116, so as to provide a flow path that allows the heated washer fluid to flow around the piston 126 toward the outflow port 120. The rubber seat sealing spacer 124 is also to be circular and is to have a diameter less than that of the head of the piston 126, so the rubber spacer does not impede flow of the heated washer fluid around the piston in the open position. In the illustrated embodiment, the flow path past the piston 126 is a thin, annular slot between the outer edge of the head of the piston 126 and the inner sidewalls of the outflow cap 116.

When the piston 126 moves toward the open position, the head of the piston moves away from the inflow cap 114, and the piston cap 130 moves axially toward the outflow cap 118. The rear side of the piston cap 130 can have standoffs 142 that block the rear side of the piston cap 130 from pressing against the rear wall of the outflow cap 116 and blocking the entrance of the outflow port 120, which would prevent the heated washer fluid from leaving the valve 38 via the outflow port 120. The standoffs 142 maintain an opening between the piston cap 130 and the entrance to the outflow port 120 when the piston 126 is in the open position. In other embodiments, the standoffs 142 can be formed on the rear wall of the outflow cap 116, or other structures positioned between the piston cap 130 and the outflow cap 116.

The upstream check valve 31 (FIG. 1), such as a one-way check valve, can be attached to the washer line 30 upstream of the heater 36, such that heated washer fluid can be held at an elevated temperature approximately equal to the temperature of the coolant flowing through the heater (e.g., approximately 200° F. under pressure around of approximately 20 psi. until the washer pump is activated, which provides the washer fluid a fluid pressure sufficient to flow through the valves and the heater. This will result in an initial high energy blast of heated fluid toward the nozzles 32. When the piston 126 is in the closed position, and in combination with the upstream check valve 31 before the washer heater (FIG. 1), the valve 38 blocks washer fluid from inadvertently leaking out of the heater 36, such that the heater remains substantially fully charged with heated washer fluid for delivery to the nozzles 32 with a minimum delay from activation of the pump. The closed piston 126 also resists an advertent flow of washer fluid that may be caused by standing washer fluid boiling in the heater as discussed above. The closed piston 126 can also help maintain the washer fluid pressure downstream of the one-way check valve 31 (FIG. 1). in the heater 36 and the washer line 30 between the heater 36 and the valve 38, which reduces the amount of washer fluid ejection that may occur as a result of the flash boiling of some of the residual washer fluid in the heater 36.

The valve 38 is also configured to allow for some backflow of washer fluid that remains in the washer line 30 between the heater 36 and the nozzles 32 after fluid pump 34 is deactivated. Such backflow of the washer fluid allows the fluid to move away from the nozzles 32 a sufficient distance so that no fluid, or at least a minimum amount of fluid, remains in the nozzle that could be susceptible to freezing and blocking the nozzle outlet in freezing environments. Such backflow can be caused by the fluid contraction due to cooling of the washer fluid in the washer line 30 downstream of the heater 36 after activation of the fluid pump 34 has stopped. Such contraction can cause a slight vacuum draw from the washer heater residual fluid cooldown contraction that pulls the washer fluid away from the nozzles 32 and partially through the valve 38. In the illustrated embodiment, the washer system 26 is configured so that, upon cooling of the washer fluid, the washer fluid in the washer lines 30 is drawn away from the nozzles a sufficient distance so any remaining washer fluid in the washer line will be in the portion of the washer line 30 within the engine compartment, rather than being external of the engine compartment and more exposed to the environmental elements.

Figure 9C:
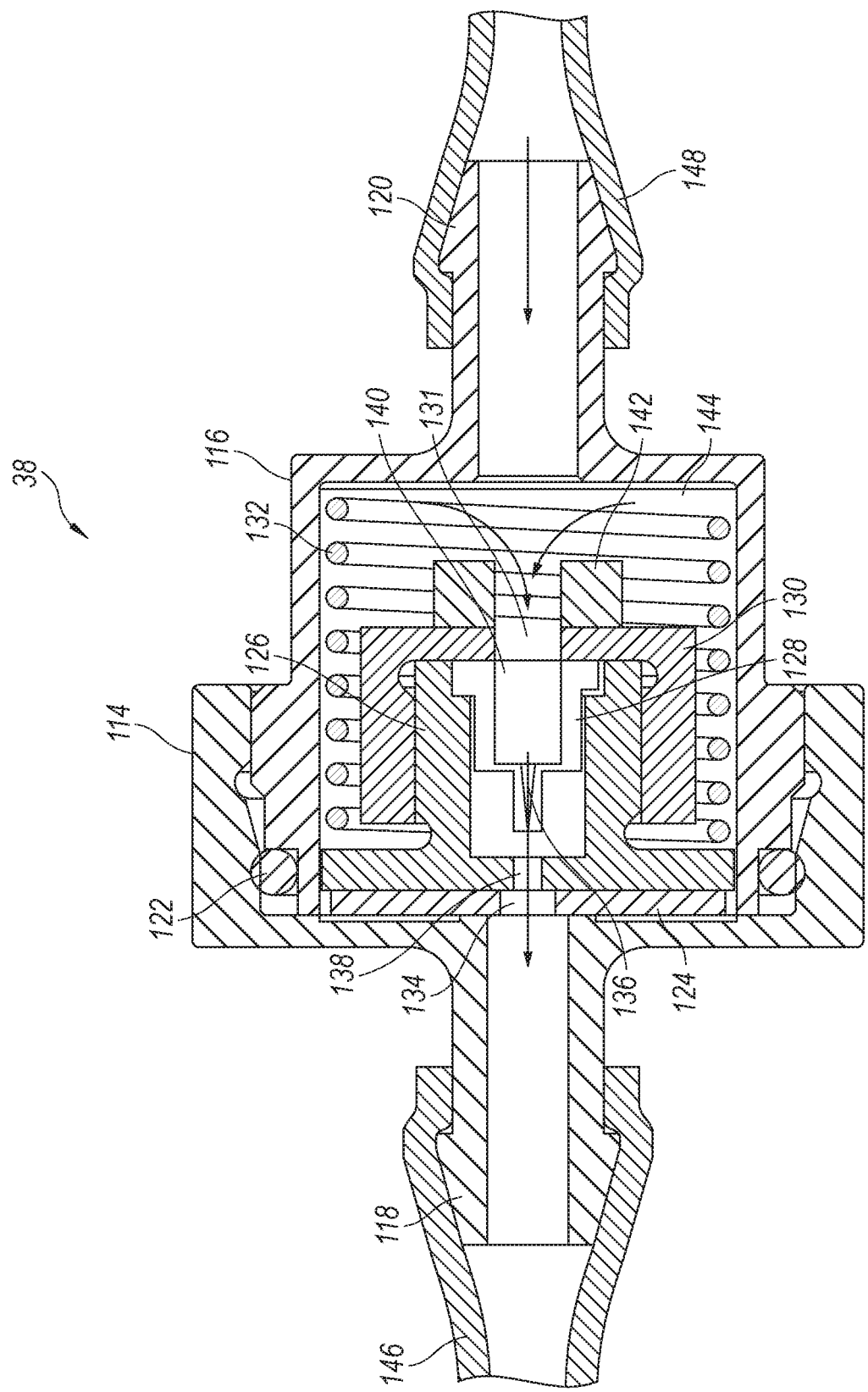
FIG. 9C is a cross-sectional view of the check valve assembly of FIG. 9A in a backflow configuration.

FIG. 9C is a cross-sectional view of the valve 38 illustrating the piston 126 in the closed position and a backflow of washer fluid moving through the valve 38 through the duckbill valve 128 after deactivation of the fluid pump 34. The backflow of washer fluid moves into the valve 38 through the outflow port 120 and into the cavity 144 within the outflow cap 116 that contains the spring 132, piston 128, and piston cap 130. The washer fluid flows through the central opening 131 in the piston cap and into the inlet 140 of the duckbill valve 128. The washer fluid entering the duckbill cavity 140 exerts a pressure and opens the one-way valve portion 136 of the duckbill valve 128, so as to allow the backflow of washer fluid to flow through the one-way valve portion 136 and through the openings 138 and 134 in the piston 126 and rubber spacer 124 to the inflow port 118. Accordingly, the duckbill valve 128 allows the small amount of washer fluid backflow to pass through the valve 38, but otherwise the duckbill valve 128 remains closed and prevents the washer fluid from bypassing the piston 126 until the piston moves away from the closed position (FIG. 9A) to the open position (FIG. 9B). While the illustrated embodiment uses a duckbill valve for a portion of the flow control, other check valve arrangements may be used in other embodiments to control the flow of washer fluid through the piston assembly.

Selector Valve

In the illustrated embodiment, the nozzles 32 are shown in FIG. 1 adjacent to the vehicle's windshield 12. In other embodiments, however, the vehicle 10 may include one or more nozzles 32 in other locations to direct the heated washer fluid onto other components of the vehicle 10, such as a rear window or other windows, headlamps, the tail lamps, the license plate/light, other lights, a Front Cross Traffic Alert sensor, an adaptive cruise control sensor, a Rear Cross Traffic Alert sensor, a side-view/lane departure alert sensor, sonar sensors used to help a driver park the car, other sensors, a backup camera, a night vision camera, other cameras, wiper blades, and/or any other desired component of the vehicle. In these embodiments, a selector valve 40 may be fluidly coupled to washer lines 30 and the nozzles 32 and configured to selectively route washer fluid to one or more selected desired nozzles 32.

Figure 10:
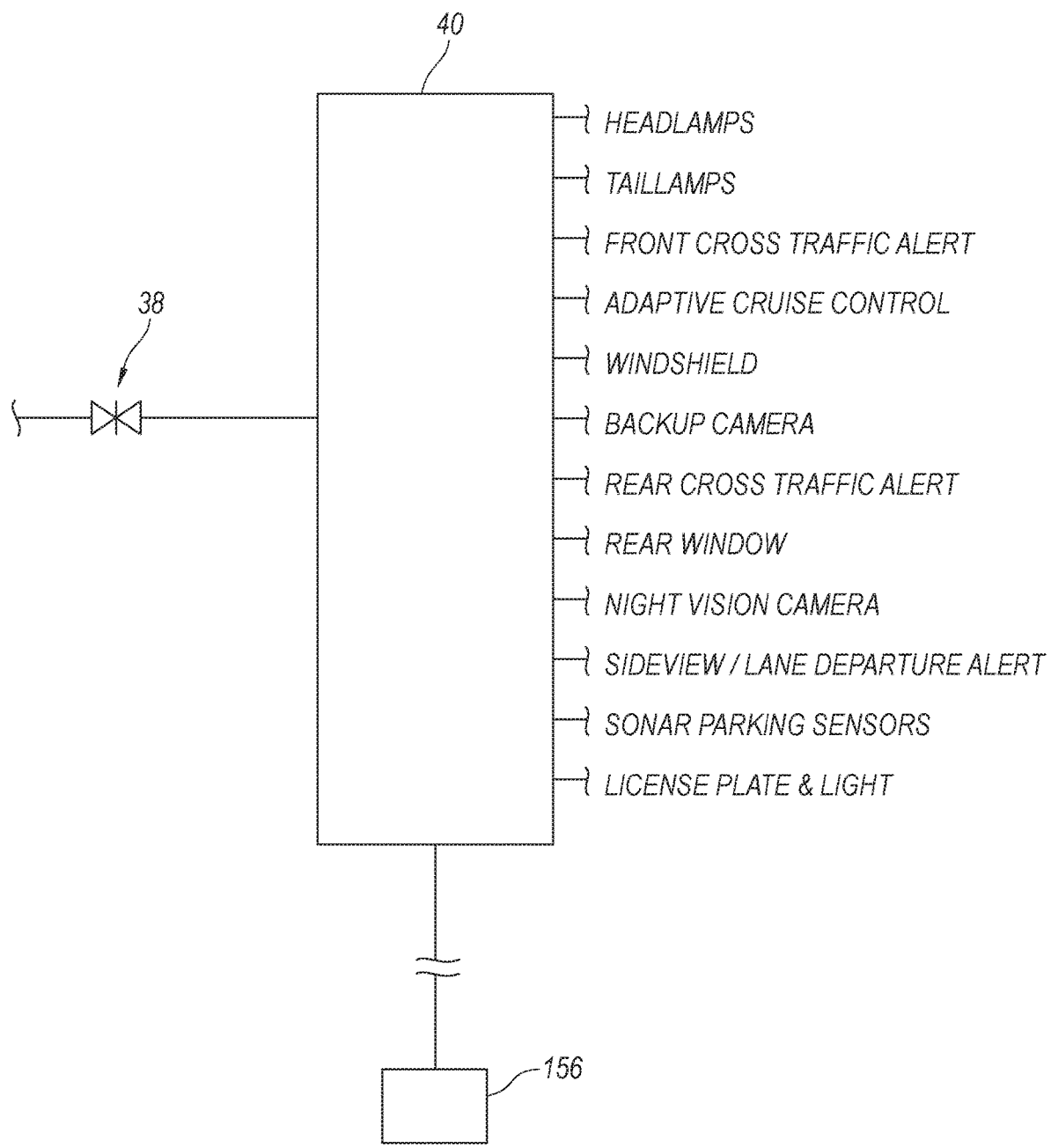
FIG. 10 is a schematic view of a fluid selector valve of the washer fluid heater system in accordance with one or more embodiments of the present technology.

FIG. 10 is a schematic view of the selector valve 40. The selector valve 40 in the illustrated embodiment is coupled between the valve 38 and a plurality of nozzles located on or adjacent to selected components of the vehicle. The selector valve 40 may be operably coupled to an electronic control unit (ECU) 156. When a user of the vehicle desires to use the washer fluid to heat a specific component of the car, the ECU 156 generates a control signal that indicates which of the nozzles the washer fluid should be routed to and provides the generated control signal to the selector valve 40. The selector valve 40 adjusts the internal configuration of the selector valve 40 based on the generated control signal so that, upon activation of a washer fluid pump, heated washer fluid is routed from the heater 36 to the portion of the washer lines 30 connected to the desired nozzle(s). The selector valve 40 can be manually or semi-manually controlled by driver selection and activation in response to the vehicle's sensor systems that can automatically sense when the sensors need cleaning and provide a signal the driver via an alert light or audible signal to take action to clean the sensor(s) via the selector valve 40. Alternatively, the selector valve 40 can be fully automated to minimize or eliminate driver distraction, such that the sensor sensing system sends a signal indicating the need for cleaning directly to the selector valve's ECU to automatically determine the selector valve position and activate the washer pump to clean the effected sensor. In some embodiments, the selector valve 40 can be configured to route heated washer fluid to only a single selected nozzle at a time. In other embodiments, the selector valve 40 is configured to simultaneously route heated washer fluid to a plurality of nozzles upon activation of the fluid pump.

In some embodiments, such as the embodiment shown in FIG. 10, the selector valve 40 is configured to receive heated washer fluid from the illustrated valve 38. In other embodiments, the washer system 26 may include a plurality of valves 38 each fluidly coupled in series between a given nozzle and the selector valve 40. In still other embodiments, the washer system 26 does not include a valve 38 and the selector valve 40 can be configured to receive the washer fluid directly from a fluid reservoir (e.g., fluid reservoir 28) or a washer fluid heater (e.g., heater 36).

Figure 11:
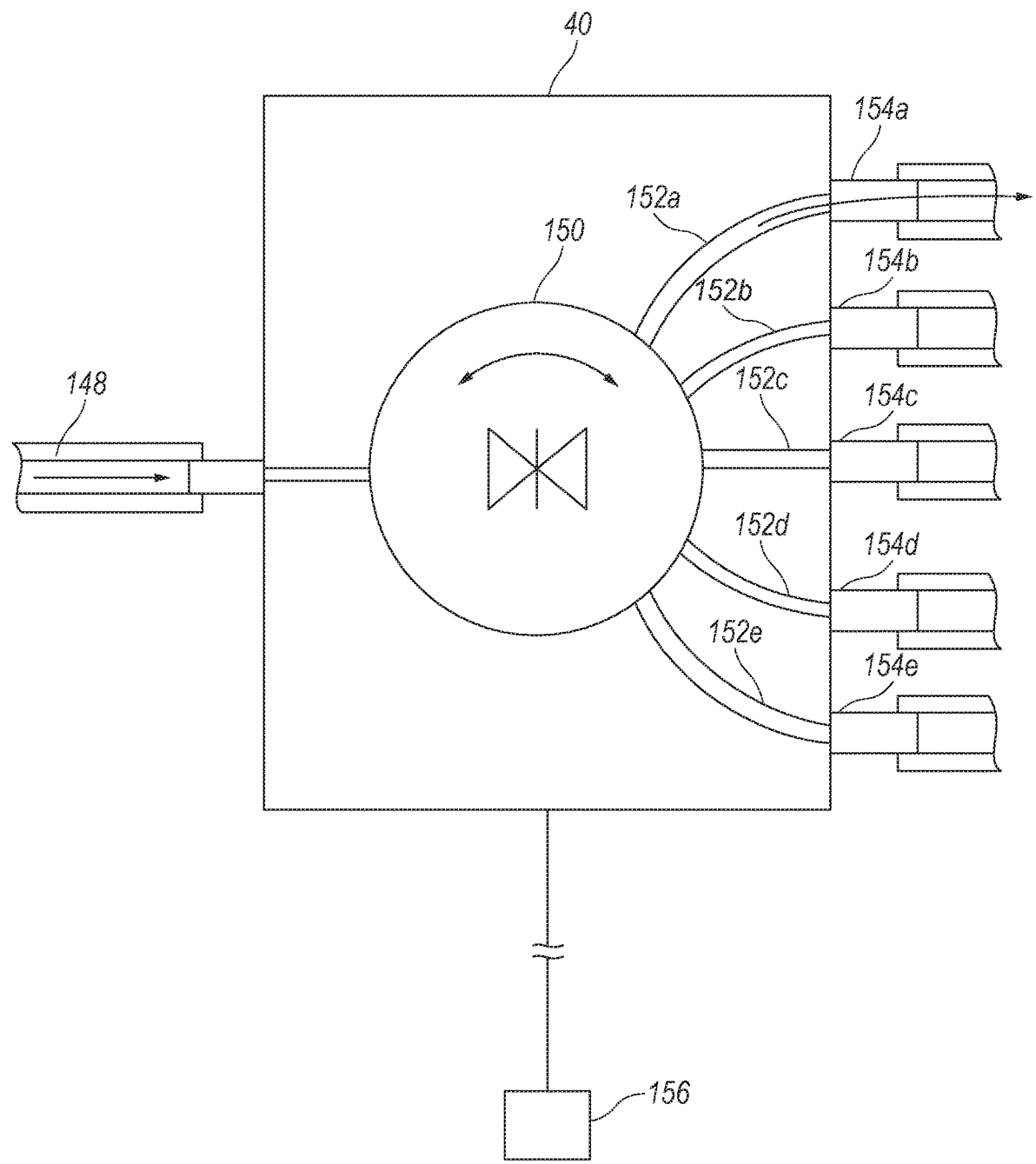
FIG. 11 is a diagrammatic view of the fluid selector valve of FIG. 10.

FIG. 11 is a diagrammatic view of the selector valve 40. The selector valve 40 is fluidly coupled to the fluid line 148 and is configured to receive washer fluid via the fluid line 148. The selector valve 40 also includes a flow selector 150 coupled to a plurality of fluid lines 152, which are used to provide fluid from the flow selector 150 to an outflow port 154. In the embodiment shown in FIG. 11, the selector valve 40 includes five outflow ports 154*a-e* coupled to the flow selector 150 with fluid lines 152*a-e*, where each of the five outflow ports 154*a-e* are coupled to one or more washer fluid nozzles.

The flow selector 150 comprises one or more adjustable valves configured to regulate the flow of washer fluid to the outflow ports 154. During operation of the selector valve 40, a control signal generated by the ECU 156 is provided to the selector valve 40. The selector valve 40 adjusts the internal configuration of the flow selector 150 based on the provided control signal by opening and/or closing the one or more adjustable valves to ensure that washer fluid is only provided to the desired outflow ports 154. In the embodiment shown in FIG. 11, the adjustable valves within the flow selector 150 have been adjusted to fluidly couple the fluid line 148 to the fluid line 152*a* such that washer fluid flows only to the first outflow port 154*a*.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A washer fluid heater for use with a vehicle having an engine cooling system and a washer fluid dispensing system, wherein the washer fluid dispensing system with a washer fluid reservoir and at least one nozzle, the washer fluid heater comprising:
- a plurality of tubular members concentrically arranged around a central axis and spaced apart from each other forming a plurality of flow channels, wherein each of the plurality of tubular members is separated from an adjacent tubular member by a respective one of the plurality of flow channels and wherein the plurality of flow channels comprises a first group of flow channels and a second group of flow channels different and fluidly isolated from the first group of flow channels;
- a first end cap coupled to a first end portion of the washer fluid heater, comprising:
  - a first washer fluid port configured to receive washer fluid from the washer fluid reservoir; and
  - a first coolant port configured to receive heated coolant from the engine cooling system; and
- a second end cap coupled to a second end portion of the washer fluid heater that opposes the first end portion, comprising:
  - a second washer fluid port coupled to the at least one nozzle, wherein the first and second washer fluid ports are fluidly coupled to the first group of flow channels and configured to carry a flow of the washer fluid therethrough; and
  - a second coolant port coupled to a second portion of the engine cooling system, wherein the first and second coolant ports are fluidly coupled to the second group of flow channels and configured to carry a flow of the heated coolant therethrough, and wherein the first and second groups of flow channels are positioned relative to each other with each flow channel in the second group of flow channels being adjacent to a respective one of the flow channels in the first group of flow channels, and wherein the flow of heated coolant in each flow channel in the second group of flow channels heats the flow of washer fluid in each flow channel in the first group of flow channels;
- wherein the plurality of tubular members comprises first, second, third, fourth, fifth, and sixth tubular members separated by first, second, third, fourth, and fifth flow channels, respectively, of the plurality of flow channels, and wherein the third tubular member is a flow splitter that separates the flow of the heated coolant flowing in the second and third flow channels.

2. The washer fluid heater of claim 1, wherein the first group of flow channels comprises the first and fourth flow channels and wherein the second group of flow channels comprises the second, third, and fifth flow channels.

3. The washer fluid heater of claim 2 wherein the first and fourth flow channels carry the flow of washer fluid, and the second, third, and fifth flow channels carry the flow of heated coolant adjacent to the first and fourth flow channels.

4. The washer fluid heater of claim 2 wherein the first and fourth flow channels carry the flow of washer fluid in a first axial direction between the first and second end caps, and the second, third, and fifth flow channels carry the flow of heated coolant adjacent to the first and fourth flow channels in a second axial direction opposite the first axial direction between the first and second end caps.

5. The washer fluid heater of claim 1 wherein the second tubular member is within the first tubular member, the third tubular member is within the second tubular member, the fourth tubular member is within the third tubular member, the fifth tubular member is within the fourth tubular member, and the sixth tubular member is within the fifth tubular member.

6. The washer fluid heater of claim 1 wherein the third tubular member is spaced axially apart from the first and second endcap by a plurality of stand offs, and configured to allow a flow of the heated coolant to flow around the third tubular member.

7. The washer fluid heater of claim 1, wherein the first end cap comprises:
- a first fluid cavity coupled to the first washer fluid port;
- a second fluid cavity coupled to the first coolant port;
- a third fluid cavity coupled to the second fluid cavity;
- a first fluid distribution channel coupled to the first fluid cavity;
- a second fluid distribution channel coupled to the second fluid cavity; and
- a third fluid distribution channel coupled to the first fluid distribution channel.

8. The washer fluid heater of claim 7 wherein the first fluid distribution channel is coupled to the first flow channel, the second fluid distribution channel is coupled to the second and third flow channels, and the third fluid distribution channel is coupled to the fourth flow channel.

9. The washer fluid heater of claim 8 wherein the first end cap is axially separated from the sixth tubular member and has a fourth fluid distribution channel, wherein the fourth fluid distribution channel is coupled to the third fluid cavity and to the fifth flow channel.

10. The washer fluid heater of claim 1, wherein first endcap further comprises:
- a first seal between the first tubular member and a first portion of the first end cap;
- a second seal between the second tubular member and a second portion of the first end cap;
- a third seal between the fourth tubular member and a third portion of the first end cap; and
- a fourth seal between the fifth tubular member and a fourth portion of the first end cap,
- wherein the first, second, third and fourth seals are spaced radially and axially apart from each other.

11. The washer fluid heater of claim 1, wherein each of the plurality of flow channels comprises an annular-shaped flow channel.

12. A washer fluid heater disposed within a vehicle having an engine cooling system and a washer fluid dispensing system, wherein the washer fluid dispensing system has a washer fluid reservoir and at least one nozzle, the washer fluid heater comprising:
- a body having first and second opposing end portions, comprising:
  - a first tubular member;
  - a second tubular member disposed within the first tubular member and separated from the first tubular member by a first flow channel;
  - a third tubular member disposed within the second tubular member and separated from the second tubular member by a second flow channel;
  - a fourth tubular member disposed within the third tubular member and separated from the third tubular member by a third flow channel;
  - a fifth tubular member disposed within the fourth tubular member and separated from the fourth tubular member by a fourth flow channel; and
  - a sixth tubular member disposed within the fifth tubular member and separated from the fifth tubular member by a fifth flow channel;

a first end cap coupled to the first end portion, comprising:
- a first washer fluid port configured to receive washer fluid from the fluid reservoir;
- a first coolant port configured to connect to the engine cooling system; and a second end cap coupled to the second end portion, comprising:
- a second washer fluid port configured to provide washer fluid to the at least one nozzle; and
- a second coolant port configured to connect to the engine cooling system, wherein—
  - the first and second washer fluid ports are coupled to the first and fourth flow channels,
  - the first and second coolant ports are coupled to the second, third, and fifth flow channels, and
  - the first washer fluid port is configured to provide the washer fluid received at the first washer port from the washer fluid reservoir to the second washer fluid port via the first and fourth flow channels;

wherein the third tubular member is a flow splitter that separates a flow of heated coolant from the engine cooling system flowing in the second and third flow channels.

13. The washer fluid heater of claim 12, the engine cooling system comprises a first portion and a second portion, and wherein:
- the second coolant port is configured to receive heated coolant from the first portion of the engine cooling system and provide the heated coolant to the first coolant port via the second, third, and fifth flow channels, and
- the first coolant port is configured to receive and direct the heated coolant to the second portion of the engine cooling system.

14. The washer fluid heater of claim 12, wherein the first end cap comprises:
- a first fluid cavity configured to receive washer fluid from the first washer fluid port;
- a second fluid cavity; and
- a third fluid cavity configured to receive coolant from the fifth flow channel, wherein the second fluid cavity is configured to receive heated coolant from the second and third flow channels and from the third fluid cavity and to provide the heated coolant to the first coolant port.

15. The washer fluid heater of claim 14, wherein the first end cap further comprises:
- a first fluid distribution channel in a first portion of the first end cap, wherein the first fluid distribution channel is coupled between the first fluid cavity and the first flow channel and configured to provide washer fluid from the first fluid cavity to the first flow channel;
- a second fluid distribution channel in a second portion of the first end cap, wherein the second fluid distribution channel is coupled between the second and third flow channels and the second fluid cavity and configured to provide heated coolant from the second and third flow channels to the second fluid cavity;
- a third fluid distribution channel in a third portion the first end cap, wherein the third fluid distribution channel is coupled between the first fluid cavity and the fourth flow channel and configured to provide washer fluid from the first fluid cavity to the fourth flow channel; and
- a fourth fluid distribution channel between an end portion of the sixth tube and the first end cap, wherein the fourth fluid distribution channel is coupled between the fifth flow channel and the third fluid cavity and configured to provide heated coolant from the fifth flow channel to the third fluid cavity.

16. An apparatus configured to receive first and second fluids, comprising:
- a plurality of tubes concentrically arranged around a central axis of the apparatus;
- a plurality of flow channels, wherein each of the plurality of tubes is separated from an adjacent tube by a given one of the plurality of flow channels and wherein the plurality of flow channels comprises a first group of flow channels and a second group of flow channels;
- a first port fluidly coupled to the first group of flow channels, wherein the first port is configured to receive the first fluid from a first fluid source and to provide the first fluid to the first group of flow channels;
- a second port fluidly coupled to the second group of flow channels, wherein the second port is configured to receive the second fluid from a second fluid source and to provide the second fluid to the second group of flow channels;
- a third port fluidly coupled to the first group of flow channels and configured to receive the first fluid from the first group of flow channels; and
- a fourth port fluidly coupled to the second group of flow channels and configured to receive the second fluid from the second group of flow channels;

wherein the plurality of tubes comprises first, second, third, fourth, fifth, and sixth tubes separated by first, second, third, fourth, and fifth flow channels, respectively, of the plurality of flow channels, and wherein the first group of flow channels comprises the first and fourth flow channels and wherein the second group of flow channels comprises the second, third, and fifth flow channels, and wherein the third tube is a flow splitter that separates the flow of the second fluid flowing in the second and third flow channels.

17. The apparatus of claim 16, wherein
the first flow channel is adjacent to the second flow channel, and
the first tube is interposed between the first and second flow channels.

* * * * *